(12) United States Patent
Nozuyama

(10) Patent No.: US 7,308,660 B2
(45) Date of Patent: Dec. 11, 2007

(54) CALCULATION SYSTEM OF FAULT COVERAGE AND CALCULATION METHOD OF THE SAME

(75) Inventor: Yasuyuki Nozuyama, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 749 days.

(21) Appl. No.: 10/758,446

(22) Filed: Jan. 14, 2004

(65) Prior Publication Data

US 2004/0205681 A1     Oct. 14, 2004

(30) Foreign Application Priority Data

Jan. 16, 2003     (JP)     ............................ P2003-008785

(51) Int. Cl.
*G06F 17/50*     (2006.01)

(52) U.S. Cl. .............................. 716/5; 716/4; 714/724; 714/738; 714/741

(58) Field of Classification Search ................ 716/4–5; 714/724, 738, 741
See application file for complete search history.

(56) References Cited

U.S. PATENT DOCUMENTS

| 6,308,293 | B1 * | 10/2001 | Shimono ..................... 714/741 |
| 6,567,946 | B1 | 5/2003 | Nozuyama |
| 6,598,211 | B2 * | 7/2003 | Zachariah et al. ............. 716/4 |
| 7,082,559 | B2 * | 7/2006 | Nozuyama .................. 714/726 |
| 7,139,956 | B2 * | 11/2006 | Nozuyama .................. 714/741 |
| 7,162,674 | B2 * | 1/2007 | Nozuyama .................. 714/741 |
| 2001/0027539 | A1 | 10/2001 | Nozuyama |

FOREIGN PATENT DOCUMENTS

| JP | 11-25147 | 1/1999 |
| JP | 11-052030 | 2/1999 |
| JP | 2000-276500 | 10/2000 |
| JP | 2001-127163 | 5/2001 |
| JP | 2001-273160 | 10/2001 |
| JP | P2003-107138 | 4/2003 |

OTHER PUBLICATIONS

U.S. Appl. No. 10/678,975, filed Oct. 2003, Nozuyama.
Official Action Letter issued Mar. 27, 2007 in counterpart Japanese application with English translation.
Sengupta, S. et al., "Defect-Based Test: A Key Enabler For Successful Migration To Structural Test," Intel Technology Journal, pp. 1-14, Q1 '99.

* cited by examiner

*Primary Examiner*—Vuthe Siek
(74) *Attorney, Agent, or Firm*—DLA Piper US LLP

(57) ABSTRACT

A calculation system of fault coverage includes a data acquiring module acquiring layout information and gate net data, a layout analysis and fault link module extracting a layout element information and generating a undetected fault list, a fault detecting module generating a detected and undetected fault list, and a weight calculating module adding layout element information as weight, based on a link file between faults and layout element information to be generated based on the layout information, the gate net data, and the detected and undetected fault list.

20 Claims, 19 Drawing Sheets

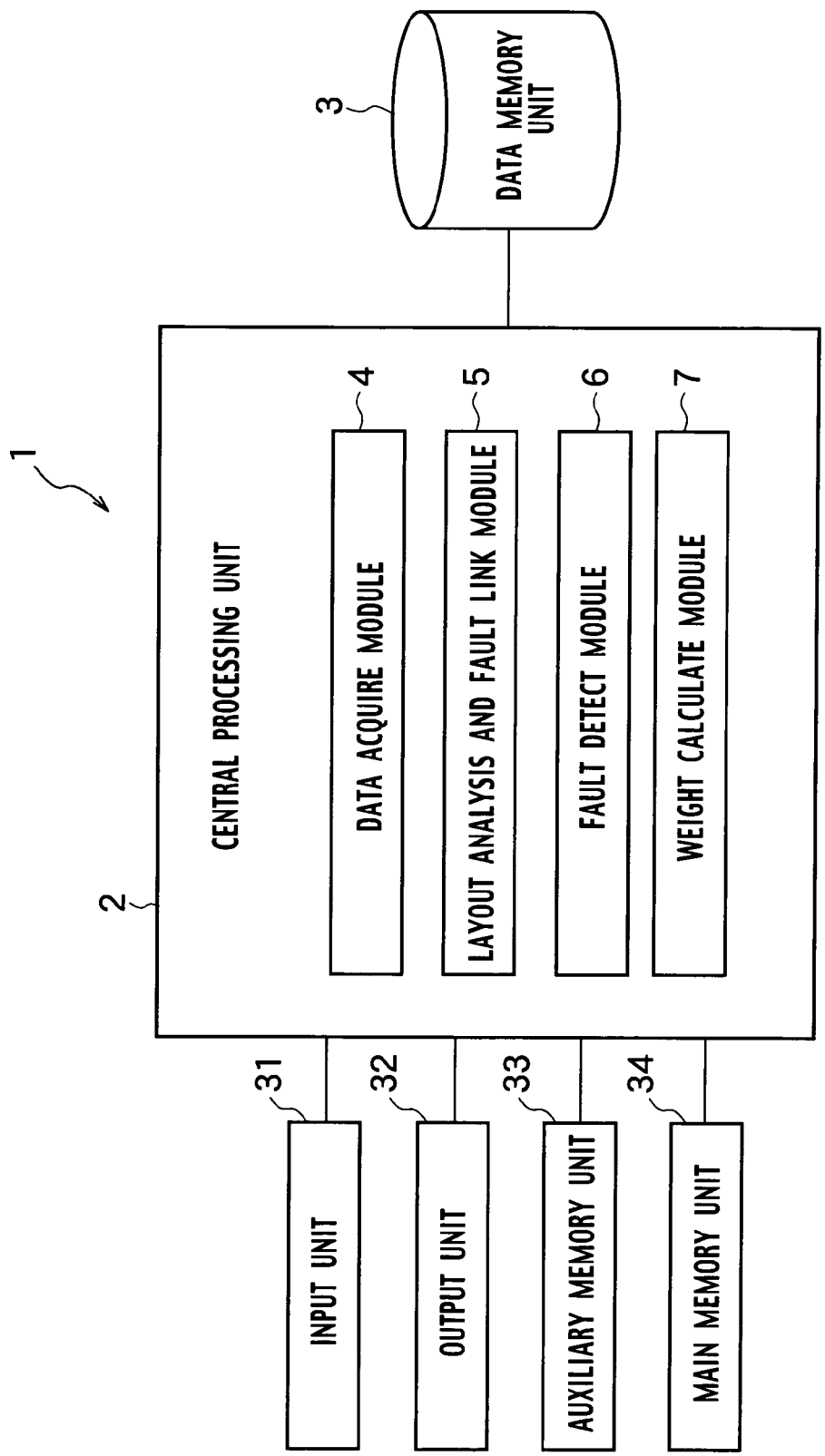

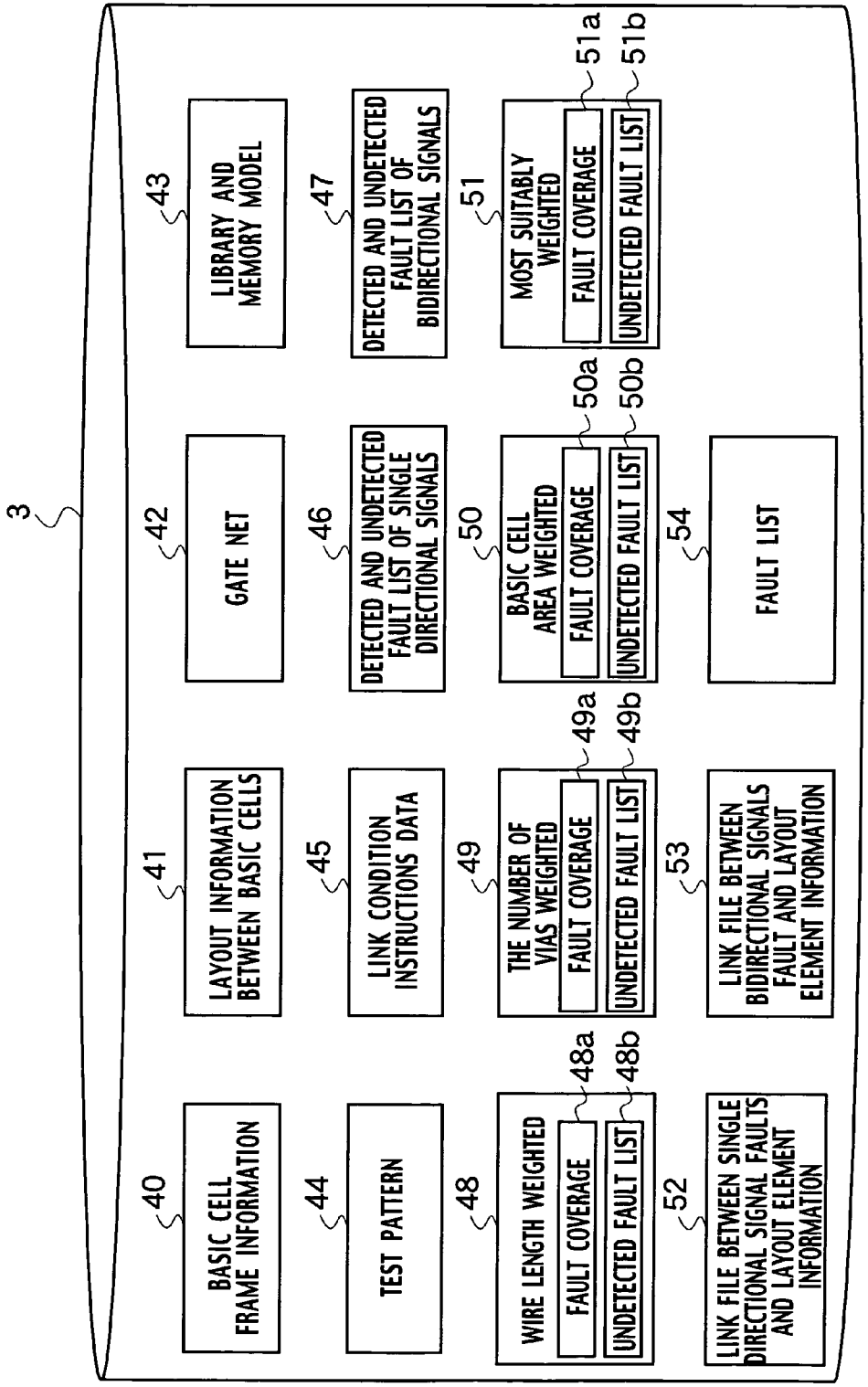

FIG. 5A
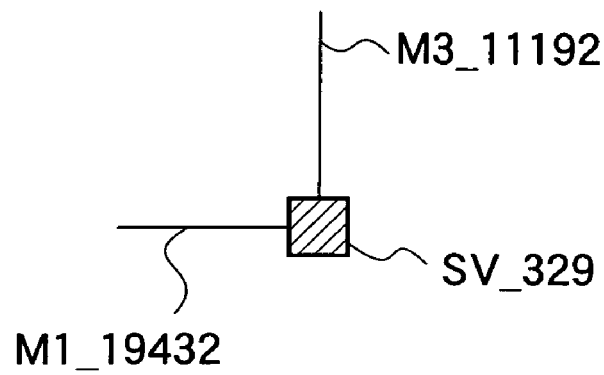
FIG. 5B
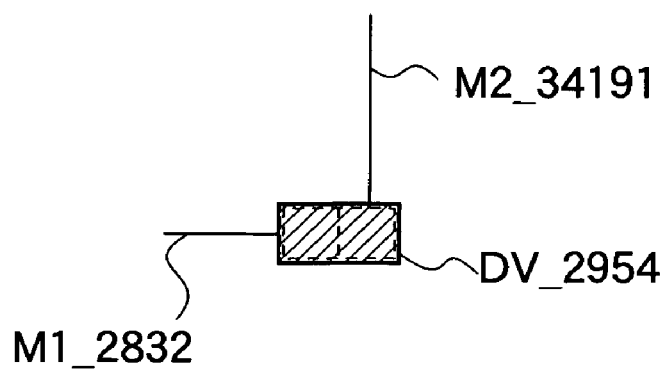
 MINIMUM VIA

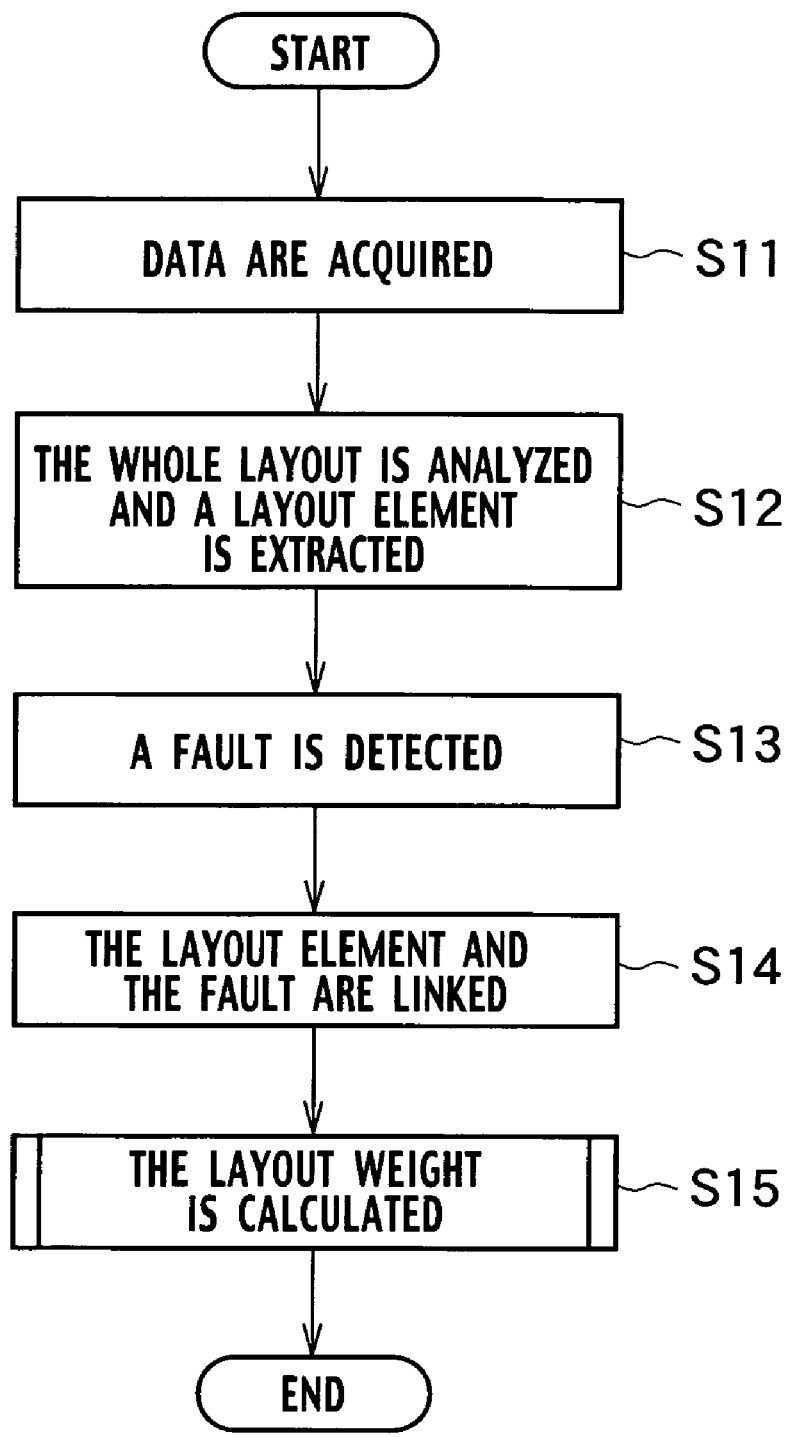

CALCULATION SYSTEM OF FAULT COVERAGE AND CALCULATION METHOD OF THE SAME

CROSS REFERENCE TO RELATED APPLICATIONS

This application is based upon and claims the benefit of priority from the prior Japanese Patent Applications No. P2003-8785, filed on Jan. 16, 2003; the entire contents of which are incorporated herein by reference.

BACKGROUND OF THE INVENTION

1. Field of the Invention

The present invention relates to a calculation system of fault coverage and a calculation method of fault coverage for large scale integrated circuit (LSI), particularly for system LSI or system on chip (SOC).

2. Description of the Related Art

In order to evaluate quality of an LSI test, a fault model has been assumed corresponding to a logical configuration inside an LSI, then a rate of fault detection has been calculated by simulation using a test pattern produced for the LSI test, and then the quality of the test pattern has been evaluated (estimated). A typical fault model includes a "net stuck-at fault model" which assumes that one of connection wiring between basic cells inside the LSI is fixed to either power supply potential (VDD) or ground potential (GND) of the LSI. A proportion of the number of detected faults from among the total number of assumed faults is referred to as fault coverage. This fault model is one of the simplest models, which has a great advantage of easy of calculating the fault coverage. In addition, this fault model can reasonably explain a correlation with a defect level of shipped LSI samples in the market. However, this fault model treats a fault on a connection wire extending across a wide range inside the LSI and a fault on a wire extending across a narrow range inside the LSI equally as one fault. Nevertheless, incidences of defects which cause faults are various and strongly dependent on such layout elements in actual devices, and the traditional fault coverage has not corresponded to such a fact. In a recent advanced LSI process with much small metal wire pitch, it is very important to take an influence of layout elements into account to further enhance test quality. Accordingly, the fault coverage according to the rate of the number of simply detected faults from among the number of the assumed faults has a serious problem.

Basically, the connection wires (the nets) can be categorized into the following two types:

i) single directional connection wires adopting a configuration of connecting one output terminal of a basic cell to input terminals of a plurality of basic cells; and ii) single directional and bidirectional connection wires adopting a configuration of connecting output terminals of a plurality of basic cells to input terminals of a plurality of basic cells.

Meanwhile, the stuck-at fault model, which is prevalent as the fault model for evaluating the fault coverage of the test pattern by assuming certain faults in the LSI, internal nodes in logical circuits inside the LSI, and the like and by calculating the rate of the faults to be detected by the test pattern configured to test operations of the LSI with the fault simulation technique, includes the "net stuck-at fault model" and a "pin stuck-at fault model". The net stuck-at fault model is a fault model which assumes that each connection wire (an internal node) inside an LSI is fixed to power supply potential or ground potential. A fault fixed to GND (the ground potential; logic 0) is called a "stuck-at 0 fault" and a fault fixed to VDD (the power supply potential; logic 1) is called a "stuck-at 1 fault". Meanwhile, the pin stuck-at fault model is a fault model which assumes that each input terminal and output terminal (pins) of an LSI and of a basic cell inside an LSI is fixed to power supply potential or ground potential, wherein a fault fixed to GND (the ground potential; logic 0) is called a "stuck-at 0 fault" and a fault fixed to VDD (the power supply potential; logic 1) is called a "stuck-at 1 fault". Moreover, fault simulation configured to define a net stuck-at fault of the internal node being fixed to "0" or "1" as an assumed fault is known to be relatively easy to calculate, and fault coverage thus obtained is known to have a considerably high correlation with a rate of faulty products which are mixed in "fault-free" products after screening by use of a test pattern, and with a defect level of LSI chips in the market after shipment. Therefore, the fault simulation defining the net stuck-at fault as the assumed fault has been predominantly.

However, as the process design rules become finer, there are more faults of open defects in which minimum-sized vias (contacts for connecting sets of metal wires which are vertically adjacent to each other) are not formed properly, for example. Here, the net stuck-at fault model has a problem in that the model cannot discern detection of such open defects. In other words, since only two stuck-at faults are defined with respect to each net in the case of the net stuck-at fault model, the model cannot detect which part of a signal path in the net is activated and detected when a fault has been detected. Accordingly, there is a risk that a defect in a minimum-sized via (hereinafter referred to as a minimum via) on the path which is not actually activated may remain undetected. For this reason, the pin stuck-at fault model has been gradually adopted along with the advance of the LSI processes.

In the bidirectional signal wire, outputs of a plurality of tristate buffers are generally connected to a plurality of terminals of basic cells which applies the bidirectional signal wire as inputs. Here, the tristate buffer is a buffer circuit which includes a high impedance state in addition to high level and low level output states. A signal transmission in such bidirectional signal wire is configured such that one tristate buffer always performs output, and outputs of the rest of the tristate buffers are set to a high impedance state, and usually the output is transmitted as a signal through any of the input terminals thereof. Therefore, in the recently popularized pin stuck-at fault model, it is difficult to determine accurately how large a layout region has been tested in the bidirectional signal wire by an applied test pattern, unless a path from an output to an input is correctly specified. However, the evaluation equipment cannot correctly specify the path from the output to the input.

SUMMARY OF THE INVENTION

An aspect of the present invention inheres in a calculation system of fault coverage including a data acquiring module configured to acquire layout information and gate net data of an LSI; a layout analysis and fault link module configured to analyze a condition of connection of an input terminal and an output terminal of a basic cell regarding an entire layout based on the layout information and the gate net data, to extract the result of the analysis as layout element information, and to generate an undetected fault list; a fault detecting module configured to execute any of fault simulation and automatic test pattern generation on the undetected fault list and to generate a detected and undetected fault list; and a weight calculating module configured to add layout element information corresponding to a fault in the detected and undetected fault list as weight, based on a link file between faults and layout element information to be generated based on the layout information, the gate net data, and the detected and undetected fault list by the layout analysis and fault link module.

Another aspect of the present invention inheres in a computer-implemented calculation method of fault coverage, including acquiring layout information and gate net data of an LSI; generating a fault list by analyzing a condition of connection of an input terminal and an output terminal of a basic cell regarding an entire layout based on the layout information and the gate net data and extracting the result of the analysis as layout element information; generating a detected and undetected fault list; and generating a link file between faults and layout element information by use of the layout information, the gate net data, and the detected and undetected fault list, and adding a layout element corresponding to any one of a detected fault and a undetected fault as weight.

BRIEF DESCRIPTION OF THE DRAWINGS

FIG. 1 is a view showing a schematic circuit configuration of a calculation system of fault coverage according to a first embodiment of the present invention;

FIG. 3 is a view showing a configuration of data structure of a data memory unit of the calculation system of fault coverage according to the first embodiment of the present invention;

FIG. 5A is a schematic view showing an example of stacked via according to the first embodiment of the present invention;

FIG. 5B is a schematic view showing an example of double via according to the first embodiment of the present invention;

FIG. 6 is a flowchart explaining a calculation method of fault coverage according to the first embodiment of the present invention;

DETAILED DESCRIPTION OF THE INVENTION

Figure 2A:
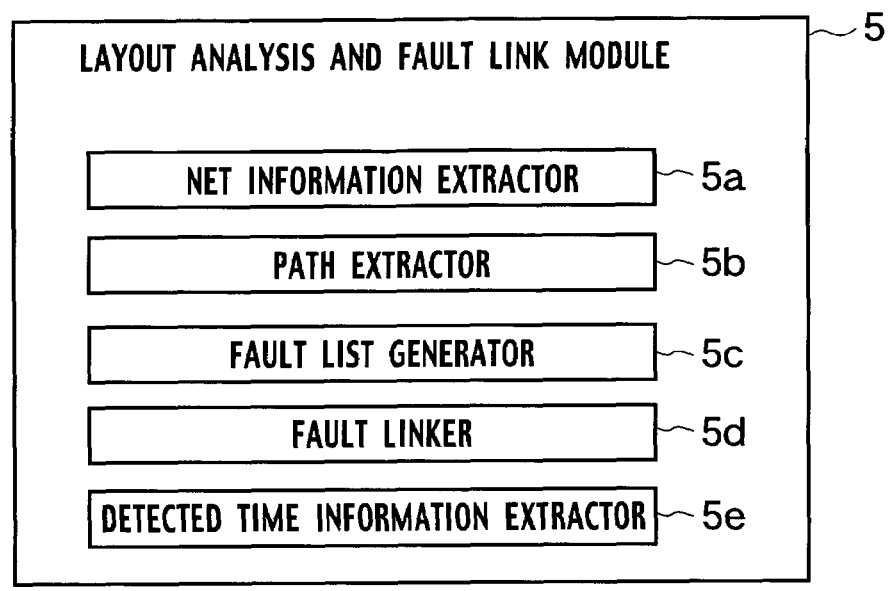
FIG. 2A is a view showing a configuration of a layout analysis and fault link module of the calculation system of fault coverage according to the first embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

In the following descriptions, numerous specific details are set forth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

FIRST EMBODIMENT

A calculation system of fault coverage 1 according to a first embodiment of the present invention encompasses an input unit 31, an output unit 32, an auxiliary memory unit 33, a main memory unit 34, a central processing unit (CPU) 2, and a data memory unit 3.

The CPU 2 encompasses a data acquire module 4, a layout analysis and fault link module 5, a fault detecte module 6, and a weight calculate module 7. The data acquire module 4 acquires layout information and a gate net of an LSI and the like, from the data memory unit 3. The layout information includes layout pattern information, wire connection information, position information (coordinates) of both ends of wire elements (straight line portion), position information (coordinates) of vias; in addition, wire lengths, the number of the vias, and the like when appropriate. The layout analysis and fault link module 5 analyzes actual connection of input terminals and output terminals of basic cells regarding the entire layout of the LSI or that of a part of the LSI based on the acquired layout information and the gate net of the LSI, and also generates a fault list. Moreover, the layout analysis and fault link module 5 generates a link file between faults and layout element information based on the layout information, the gate net of the LSI, and a detected and undetected fault list which is an output from the fault detecte module 6. The fault detecte module 6 executes fault simulation or an automatic test pattern generator (ATPG) on faults which are extracted (assumed) by the layout analysis and fault link module 5 and thereby acquires detected and undetected information (generates the detected and undetected fault list). In particular, the fault detecte module 6 causes fault information concerning a bidirectional signal to include information on detected time. The weight calculate module 7 adds a layout element corresponding to the fault detected by the fault detecte module 6 or the undetected fault as "weight" based on the link file between faults and layout element information outputted by the layout analysis and fault link module 5. Here, as layout elements to be linked to these fault, there can be wire length, the number of minimum vias, the number of stacked vias each via of which are configured plumb), an area of the basic cell and the like. Recently, as for the number of minimum via, there is the double via method to make at least two of minimum via for open defect, then it is had to consider that double via is counted at the properly lower ratio than other minimum via. (see FIGS. 5A and 5B)

Figure 8:
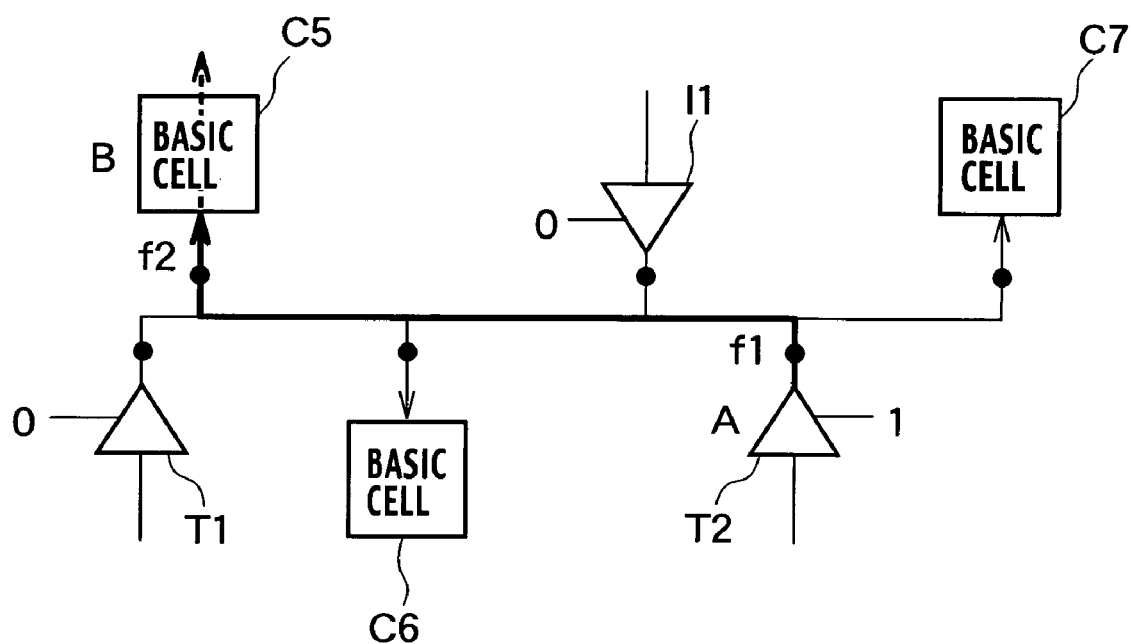
FIG. 8 is a schematic view showing an example of bidirectional wiring to explain a calculation method of fault coverage according to the first embodiment of the present invention.

As shown in FIG. 2A, the layout analysis and fault link module 5 encompasses a net information extractor 5a, a path extractor 5b, a fault list generator 5c, a fault linker 5d, and a detected time information extractor 5e. The net information extractor 5a extracts net information including input/output terminal information of the basic cells from the layout information and the gate net data of the LSI acquired by the data acquire module 4. The path extractor 5b extracts a path connecting basic cells (from an output terminal of a basic cell to an input terminal of another basic cell) from the layout information and the gate net data of the LSI acquired by the data acquire module 4. The reason for information on the path is required being that transmission or detection of a fault is performed through the path. For example, when the fault simulation is executed by use of a function test pattern for allowing the LSI to execute a functional operation, a fault transmitted through a path activated in a certain cycle is temporarily stored as a result of the simulation from a buffer T2(A) to a basic cell C5(B) in (a memory area provided in response to) the basic cell C5(B) or stored in (a memory area provided in response to) another basic cell through the basic cell C5(B) as shown in FIG. 8. When this stored result is confirmed as being read out of a chip at certain time thereafter, a fault f1 assumed to have occurred on an output terminal of the buffer T2(A) and a fault f2 assumed to have occurred on an input terminal of the basic cell C5(B) will be detected at the same time. The fault list generator 5c generates a fault list by use of basic cell frame information including such as name and position of input/output terminals, shape and area, layout information between basic cells, and the gate net which are stored in the data memory unit 3. The fault linker 5d links the basic cell frame information, the layout information between basic cells, and the gate net which are stored in the data memory unit 3, and fault lists acquired by execution of the fault simulation or the ATPG which are outputs from the fault detecte module 6, namely, a detected and undetected fault list of single directional signals 46 and a detected and undetected fault list of bidirectional signals 47, based on link instruction data, and thereby generates the link file between faults and layout element information severally for the single directional signal and the bidirectional signal. The detected time information extractor 5e extracts information indicating that the corresponding path from which the faults assumed to occur on the input terminal and on the output terminal are detected at the same time is activated and that the faults are detected, from the detected and undetected fault list of bidirectional signals 47, that is the output from the fault detecte module 6.

Figure 2B:
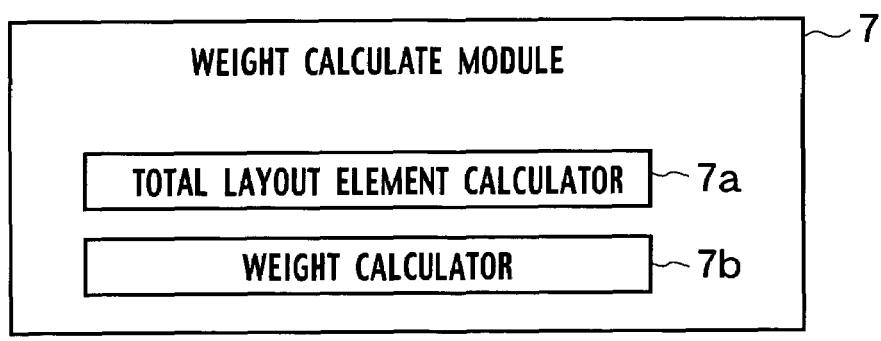
FIG. 2B is a view showing a configuration of a weight calculating module of the calculation system of fault coverage according to the first embodiment of the present invention.

As shown in FIG. 2B, the weight calculate module 7 encompasses a total layout element calculator 7a and a weight calculator 7b. The total layout element calculator 7a calculates a total amount of each layout element that is the connection wire and the like. But generally, a redundant fault (the fault that cannot be detected by an application of any test pattern, or the fault that cannot be detected in a use condition of a user of the LSI) is excluded from the total amount of the layout element. The weight calculator 7b calculates weighted pin stuck-at fault coverage and a weighted undetected fault list which include wire length weighted fault coverage 48a and a wire length weighted undetected fault list 48b, number of vias weighted fault coverage 49a and a number of vias weighted undetected fault list 49b, basic cell area weighted fault coverage 50a and a basic cell area weighted undetected fault list 50b, most suitably weighted fault coverage 51a and a most suitably weighted undetected fault list 51b, and the like based on the contents of the link file between faults and layout element information.

It should be noted that the CPU 2 encompasses a database manager and an input/output manager which are not shown in the drawing. Moreover, when an input to or an output from the data memory unit 3 is required, a location of storage of a necessary file is searched by use of this database manager and reading and writing of the file is thereby performed. On the other hand, when an input to or an output from the CPU 2 is required, a file is inputted from the input unit 31 or a file is outputted to the output unit 32, the auxiliary memory unit 33 or the like by use of this input/output manager. Here, the data memory 3 may be encompassed in the auxiliary memory unit 33 when appropriate.

As shown in FIG. 3, the data memory unit 3 stores information such as basic cell frame information 40, layout information between basic cells 41, a gate net 42, a library and memory model 43, a test pattern 44, a fault list 54, link condition instructions data 45, the detected and undetected fault list of single directional signals 46, the detected and undetected fault list of bidirectional signals 47, a link file between single directional signal faults and layout element information 52, a link file between bidirectional signal faults and layout element information 53, the wire length weighted fault coverage 48a and the wire length weighted undetected fault list 48b, the number of vias weighted fault coverage 49a and the number of vias weighted undetected fault list 49b, the basic cell area weighted fault coverage 50a and the basic cell area weighted undetected fault list 50b, the most suitably weighted fault coverage 51a and the most suitably weighted undetected fault list 51b, and the like.

The input unit 31 encompasses a keyboard, a mouse or an authentication unit such as an OCR, a graphical input unit such as an image scanner, a special input unit such as a voice recognition device. Meanwhile, the output unit 32 encompasses a display unit such as a liquid crystal display or a CRT display, a printer such as an ink-jet printer or a laser printer, and the like. Moreover, the unillustrated input/output manager (an input/output interface) is provided as an interface for connecting the input unit 31, the output unit 32, the auxiliary memory unit 33, a reader for a memory unit such as a CD-ROM, an MO or a flexible disk, or the like to CPU 2. From the viewpoint of a data flow, the input/output controller is the interface for the input unit 31, the output unit 32, the auxiliary memory unit 33 or the reader for the external memory unit with the main memory unit 34. The main memory unit 34 includes a ROM and a RAM. The ROM works as a program memory unit or the like which stores a program to be executed by the CPU 2. The RAM temporarily stores the program for the CPU 2 and data which are used during execution of the program, and also works as a temporary data memory to be used as a work area. It should be noted that the calculation system of fault coverage according to the first embodiment of the present invention encompasses a fault simulator and an ATPG configured to selectively designate faults related to signal direction and thereby to retain information on the number of detection.

Figure 4:
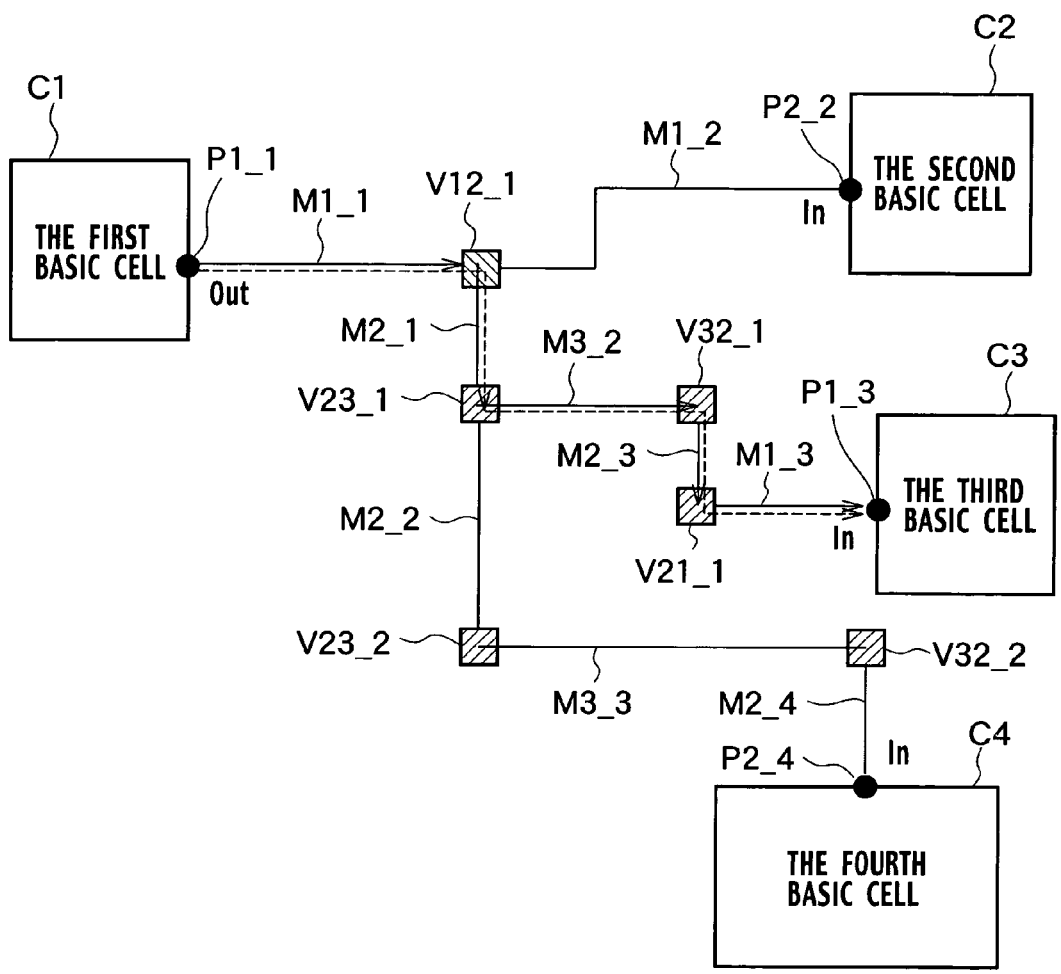
FIG. 4 is a schematic view showing layout elements evaluated by the calculation system of fault coverage according to the first embodiment of the present invention.

Now, one embodiment of a connection wiring configuration of the LSI evaluated by the calculation system of fault coverage 1 according to the first embodiment of the present invention will be described with reference to FIG. 4. As shown in FIG. 4, the LSI evaluated by the calculation system of fault coverage 1 according to the first embodiment of the present invention includes at least a first basic cell C1, a second basic cell C2, a third basic cell C3, a fourth basic cell C4, an output terminal (pin) P1_1, input terminals (pin) P2_2, P1_3, and P2_4, metal wire portions M1_1, M1_2, M2_1, M2_2, M3_2, M2_3, M1_3, M3_3, and M2_4, and minimum vias (VIA) V12_1, V23_1, V23_2, V32_1, V32_2, and V21_1. It is possible to denote the V32_1, V32_2 and V21_1 by V23_3, V23_4 and V12_2, respectively.

The output terminal (pin) P1_1, the input terminals P2_2, P1_3, and P2_4, and the first to fourth basic cells C1 to C4 are mutually connected by the metal wire portion M1_1, M1_2, M2_1, M2_2, M3_2, M2_3, M1_3, M3_3 and M2_4. Moreover, while regarding the LSI as a collection of the connection wires (the nets), it is possible to express which basic cells are mutually connected via which input terminals and output terminals by which connection wire portions.

In FIG. 4, layout elements are expressed in accordance with a notation of "C|P|M|V Layer (Layer)_a serial number". Here, "C" denotes a basic cell, "P" denotes a terminal (pin), "M" denotes metal wire portion, and "V" denotes a via (of the minimum size), respectively. "Layer" denotes a layer of the metal wiring (layers 1, 2, 3, ... from the bottom). "Layer Layer" in the case of the via indicates as to which two layers of the metal wiring the via is connected along a direction of PATH. For example, "P1_1" shown in FIG. 4 means a first path on the first layer.

Here, as an example for a detailed viewpoint of FIG. 4, a path (PATH_3) indicated with a broken line arrow in FIG. 4, for example, is extracted as the following style based on the layout information and the like outputted by a layout tool at the layout analysis and fault link module 5: "PATH_3: P1_1 (/xx/yy/U12/A), M1_1, V12_1, M2_1, V21_1, M3_2, V32_1, *M2*_3, V21_1, M1_3, P1_3 (/xx/zz/U321/A)". Meanwhile, the information on the input terminal and the output terminal (pin) to be connected to the net is extracted as the following style in the case of P1_3, for example: "P1_3: /xx/zz/U321, A, FF1, sa0, HD, in". Here, "/xx/zz/U321" denotes an instance name, "A" denotes a terminal name, "FF1" denotes a basic cell name, "sa0" denotes an assumed fault, "HD" denotes detected information (hard detected, etc.), and "in" denotes distinction of input and output. Moreover, a length of the metal wire portion (such as M2_1) on the drawing can be extracted from the following expression of "M2_1: 566;", for example. Here, "566" represents the length of the metal wire portion M2_1.

In this way, the above-described PATH expression exactly reproduces the signal path along the PATH. When a fault assumed to occur on an output end (which is the input terminal P1_3 of the basic cell) is detected, it is possible to calculate layout weight corresponding to the detected fault by use of data extracted from the layout information and the like. With these PATH expressions, it is possible to calculate a metal wire length, the number of (minimum) vias, and an area of the basic cell to the path of which the output terminal is connected, corresponding to the detected path. When two or more faults are detected, it is necessary to combine the layout weight of a plurality of paths. However, duplicate addition of an element which has been already added should be avoided. As described above, according to the present embodiment, a layout element corresponding to single directional connection wires adopting a configuration such that one output terminal of a basic cell is connected to input terminals of a plurality of basic cells (a type similar to the single directional connection wire adopting the configuration such that one output terminal of a basic cell is connected to input terminals of a plurality of basic cells) can be added naturally to each fault as the weight in the pin stuck-at fault model. Here, as shown in FIGS. 5A and 5B, the stacked via and the double via are expressed in accordance with a notation of "SV Layer Layer_a serial number" and a notation of "DV Layer Layer—a serial number". The stacked via includes the number of the minimum via of a difference of a Layer number written in this expression. SV31_1283, for example, is consists of two minimum via between Layer1 and Layer2 and between Layer2 and Layer3. The frequency of defect occurrence of the stacked via may become higher (different) than the single minimum via, it is necessary to change the layout weight with the minimum via. Accordingly, it is necessary to multiply the number of stacked vias by a suitable ratio when it is based on the number of minimum vias. Meanwhile, frequency of open defect occurrence may particularly deteriorate greatly in the double vias, then it is also necessary to multiply the number of double vias by a suitable ratio based on the number of minimum vias. Here, there is a case to use the stacked via and the double via simultaneously, the via is expressed in accordance with a notation of "SDV Layer Layer_a serial number", for example.

On the contrary, in a bidirectional connection wire adopting a configuration such that output terminals of a plurality of basic cells are connected to input terminals of a plurality of basic cells (a type similar to the bidirectional connection wire adopting the configuration such that output terminals of a plurality of basic cells are connected to input terminals of a plurality of basic cells), a combination of traditional methods cannot clearly determine path which transmits a detected fault. As a result, such a combination cannot add proper layout weight. Therefore, a calculation method of fault coverage according to the first embodiment of the present invention will be described with reference to FIG. 6 to FIG. 12, which is capable of clearly determining the path also in the bidirectional connection wires, adopting the configuration such that output terminals of a plurality of basic cells are connected to input terminals of a plurality of basic cells, and as a resultant, adding proper layout weight.

Firstly, a flow of procedures for the calculation method of fault coverage according to the first embodiment of the present invention will be described with reference to FIG. 6.

(a) In Step S11 of FIG. 6, the data acquire module 4 of FIG. 1 acquires the layout data and the gate net data of the LSI from the data memory unit 3. Then, in Step S12, the layout analysis and fault link module 5 of FIG. 1 analyzes the entire layout by use of the acquired layout data and the gate net of the LSI, and extracts the layout element data including a relation of connection between the input terminal and the output terminal, the path, a relation of connection of wires (wire portions), the wire length, the number of vias, and the like.

(b) Next, in Step S13, the fault detecte module 6 performs pin stuck-at fault simulation and the like, and thereby generates the detected and undetected fault list. Then, in Step S14, the layout analysis and fault link module 5 links the layout element data extracted in Step S12 with the detected and undetected faults in the detected and undetected fault list generated in Step S13, and thereby generates the link file between signal faults and layout element information. In Step S15, the weight calculate module 7 adds a layout region or a layout element which covers the path to the input terminal of the basic cell corresponding to the fault detected as a result of the pin stuck-at fault simulation, as the detected layout weight. In this event, when a fault corresponding to another input terminal is detected, the weight calculate module 7 is arranged to add only a newly detected portion other than the layout region or the layout element which has already been added. Such an operation is performed on all the detected faults. Thereafter, the total layout element amount of the detected faults is obtained and is divided by the total layout element amount obtained by the total layout element calculator 7*a*, thus obtaining layout-weighted fault coverage. Meanwhile, a weighted undetected fault list is also generated by adding the layout element weight to the undetected faults.

Figure 7:
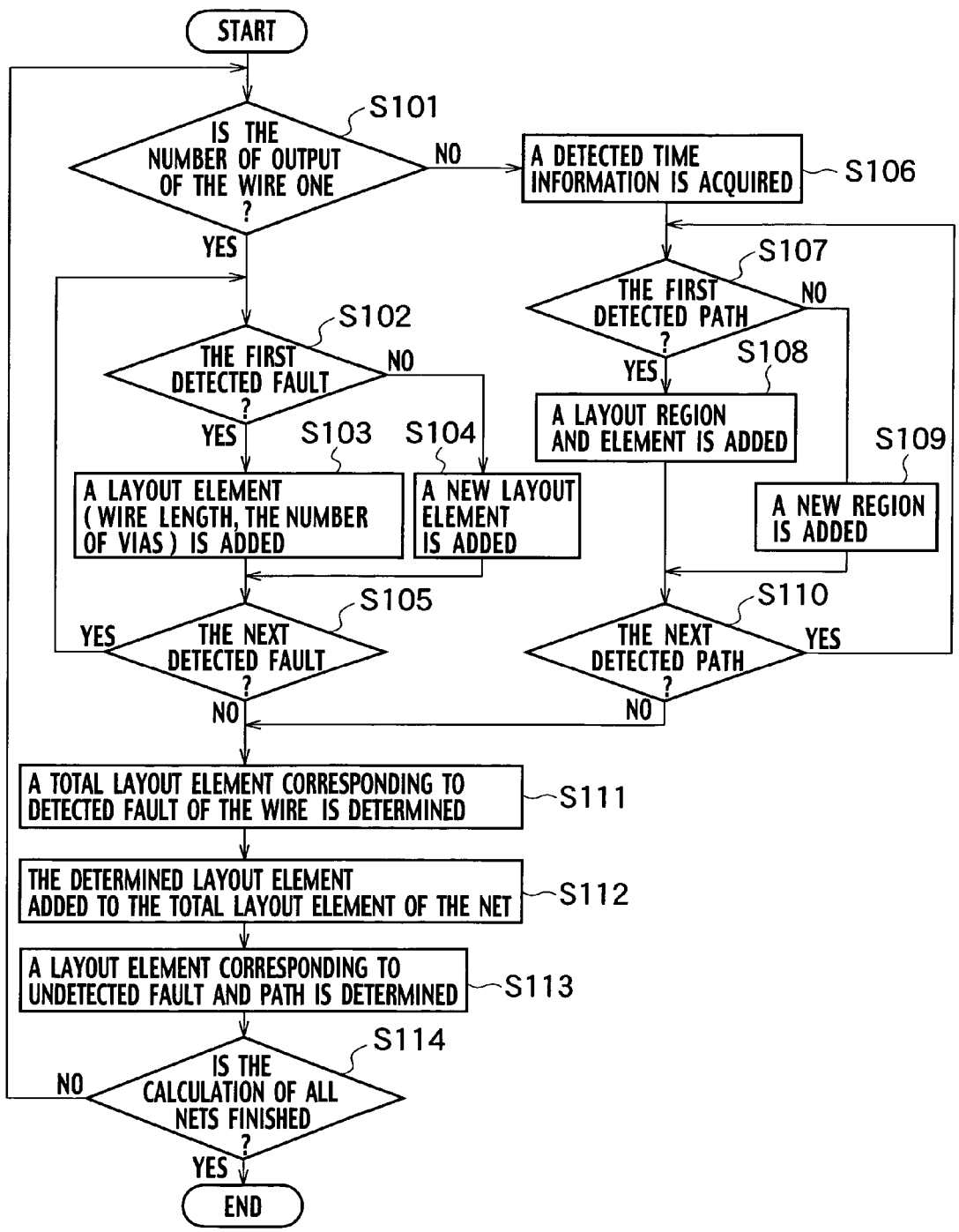
FIG. 7 is a flowchart explaining a calculation method of a layout weight in the calculation method of fault coverage according to the first embodiment of the present invention.

Now, a method of calculating the layout weight in Step S15 shown in FIG. 6 will be described in detail with reference to FIG. 7.

(a) Firstly, in Step S101, judgment is made as to whether or not the number of outputs of the connection wire (the net) is equal to one. When the number of outputs of the connection wire is plural, that is, when the connection wire is bidirectional signal wire, then the process moves to Step S106. When the number of outputs of the connection wire is equal to one, that is, when the connection wire is single directional signal wire, then the process moves to Step S102.

(b) In Step S102, judgment is made as to whether or not the fault is a first detected fault. When the fault is the first detected fault, the layout element including the length of wire portions, the number of vias, and the like is added in Step S103. When the fault is judged to be a second or later detected fault in Step S102, only a newly added layout element is added in Step 104. Thereafter, judgment is made as to whether or not a subsequent detected fault exists. When there is a subsequent detected fault, the process returns to Step S102 and the procedures from Step S102 to Step S105 are repeated. If there no subsequent detected faults, then the process moves to Step S111 and the total layout elements corresponding to the detected faults in the connection wire is obtained.

(c) When the number of outputs of the connection wire is plural that is, when the connection wire is bidirectional signal wire, detected time information is acquired from the link file between bidirectional signal faults and layout element information in Step S106. Moreover, when there is an activated path from which a fault is detected, a corresponding layout region or layout element is deemed to be detected on the bidirectional signal wire.

(d) To be more precise, judgment is made in Step S107 as to whether or not the path is a first detected path (note that there are two types of path, namely, one corresponding to the stuck-at 1 fault and one corresponding to the stuck-at 0 fault in terms of the same layout element). In the case of the first detected path, the layout region or the layout element deemed as detected is added as the weight in Step S108. When the path is a second or later path, only a newly added region is added thereto as the weight in Step S109.

(e) Then, the total layout elements of the connection wiring corresponding to the detected faults are obtained in Step S111. Thereafter, results obtained in the procedures from Step S101 to S114 are finally added in terms of all the connection wires (the nets) and are divided by the total layout elements obtained by the total layout element calculator 7*a*. Accordingly, the layout weighted fault coverage including the wire length weighted fault coverage, the number of via weighted fault coverage, the basic cell area weighted fault coverage, and the like are calculated based on the following formulae:

$$\eta 1 = ld/l0 \quad (1)$$

where the wire length weighted fault coverage is $\eta 1$, wire length corresponding to the detected fault is ld, and wire length corresponding to evaluated total wire length with that corresponding to redundant faults being deducted is l0;

$$\eta 2 = nd/n0 \quad (2)$$

where the number of via weighted fault coverage is $\eta 2$, the number of vias corresponding to the detected fault is nd, and a number of vias corresponding to the evaluated total number of vias with that corresponding to redundant faults being deducted is n0; and $$\eta 3 = Sd/S0 \quad (3)$$

where the basic cell area weighted fault coverage is $\eta 3$, a basic cell area corresponding to the detected fault is Sd, and an area corresponding to evaluated total basic cell area with that corresponding to redundant faults being deducted is S0. Here, it is also possible to obtain the "most suitably" weighted fault coverage by assuming relative weight among these layout elements appropriately based on process information and the like. It should be noted that the layout elements corresponding to the undetected faults are obtained for each connection wire in Step S112, and results thereof are outputted as the weighted undetected fault list.

The ATPG which is supposed to scan flip-flops and latches inside the LSI generates test patterns so as to substantially equalize circuits inside the LSI to a combinational logic circuit, and lists up the detected faults for each test pattern. Accordingly, such lists are subjected to investigation as to whether a starting point and an ending point corresponding to each path is set to a detected state at the same time, and when applicable, layout elements corresponding to such a path are added. A need for attention to prevent duplicate addition and to obtain the total layout elements of the evaluated connection wiring is the same as in the case of using the fault simulation.

In both the case of the above-described fault simulation and the ATPG, in terms of how the test pattern could actually cover the layout region on the bidirectional signal wire (the net), it is inappropriate to remove each pin stuck-at fault from evaluated faults by detecting the fault only once as in the method. Instead, the detection information needs to be acquired a number of times. This is because the fault simulator or the ATPG does not include a function for performing detection a number of times, in many cases for the purpose of saving CPU time. Accordingly, a function for reporting the detected status for a number of times should be provided at least the faults which are assumed at the terminals to be connected to the bidirectional signal wires. Although it is preferable that such a number of times be unlimited, a certain limitation (such as ten times) may be provided, considering the trade-off with the CPU time. However, when a limitation is provided, a scheme such as prevention of duplicate counting of the same path is necessary. Regarding this, a function which can recognize detection of all the paths, which have been extracted on the bidirectional signal wires, as the paths or a set of faults to be defined at the starting or ending point of the paths may be added to the fault simulator or the ATPG.

CONCRETE EXAMPLE

Figure 9:
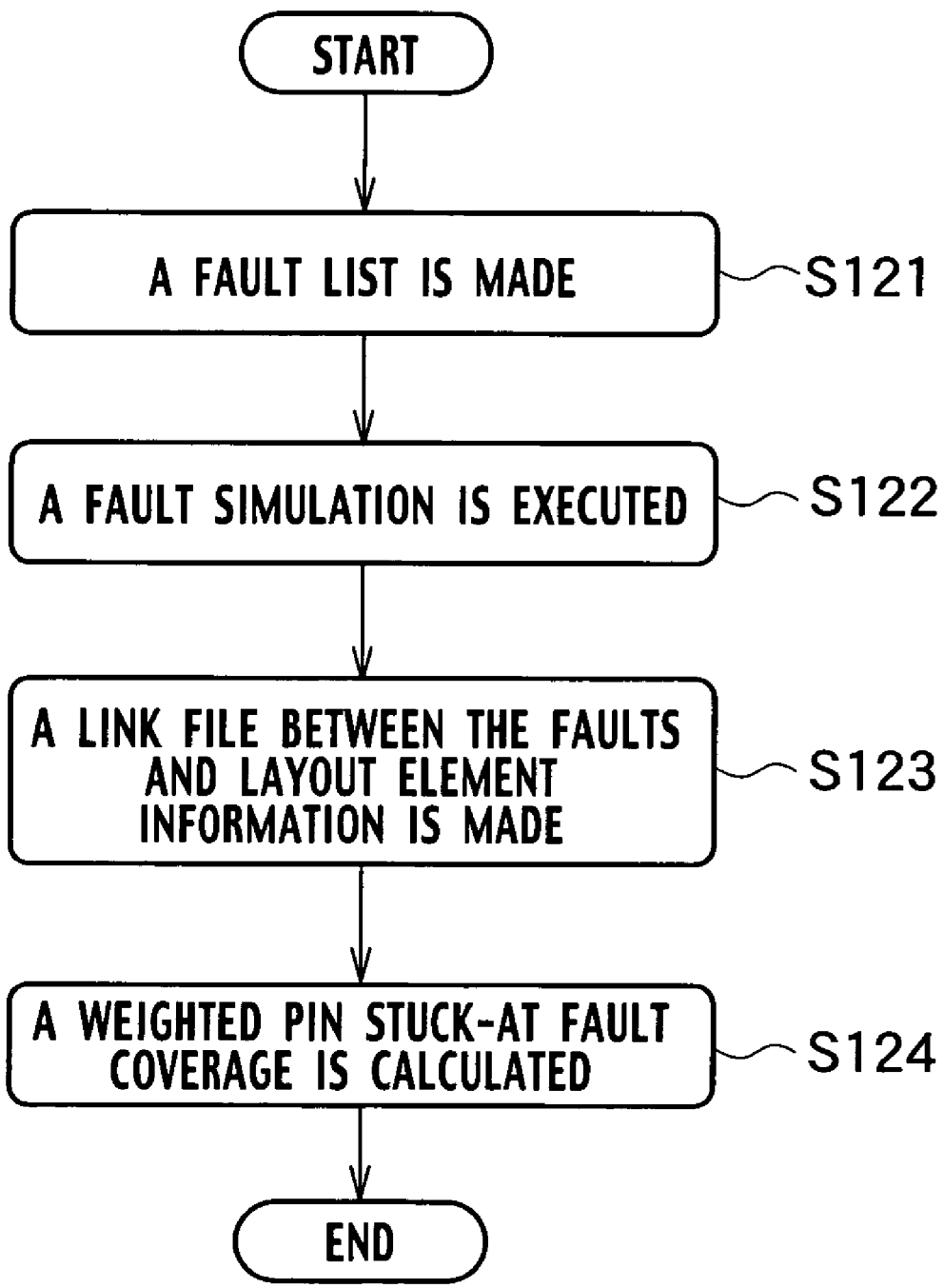
FIG. 9 is a flowchart explaining an example of a calculation method of fault coverage according to the first embodiment of the present invention.
Figure 10:
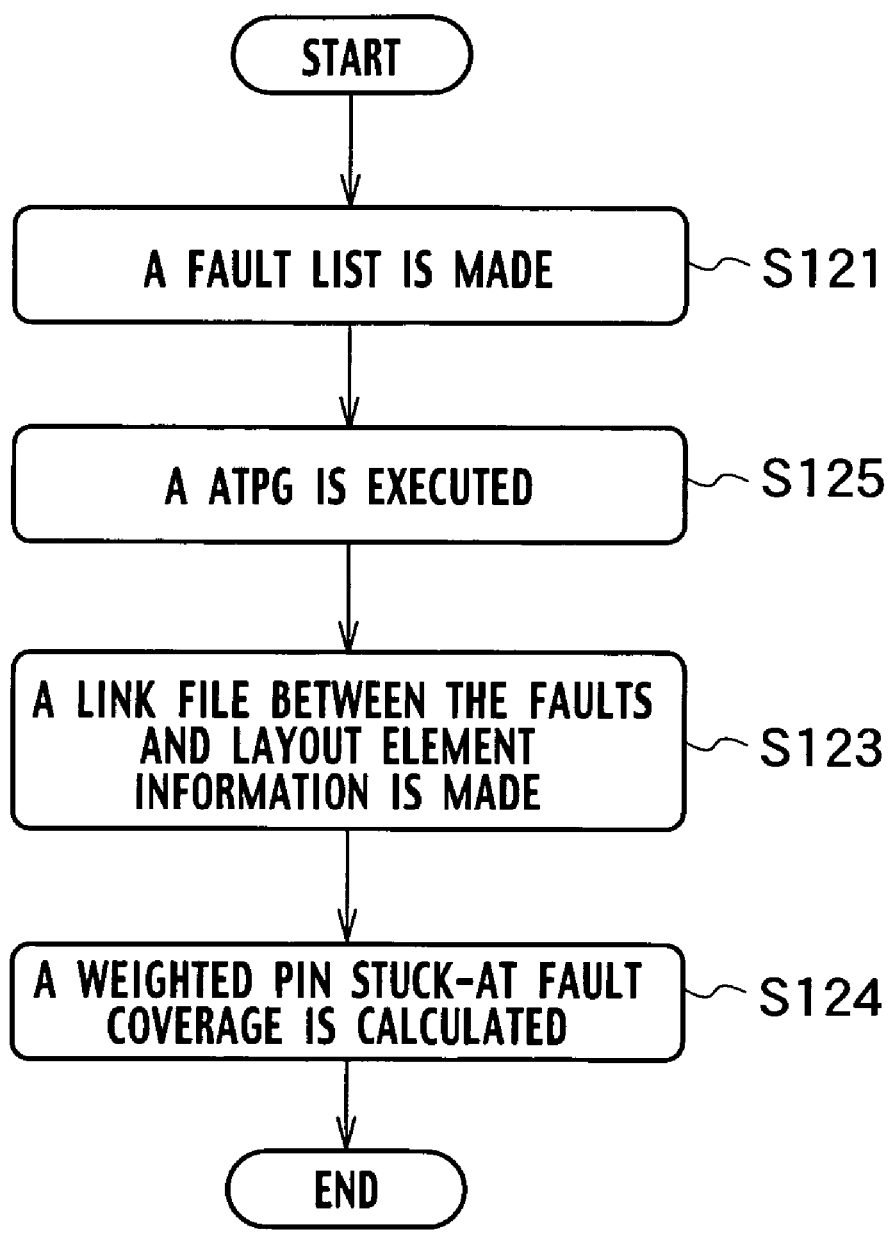
FIG. 10 is a flowchart explaining another example of the calculation method of fault coverage according to the first embodiment of the present invention.

FIG. 9 is a flowchart showing an example of a method in the case of calculating the fault coverage by use of the fault simulation. FIG. 10 is a flowchart showing an example of a method in the case of calculating fault coverage by use of the ATPG. In the following, examples of the calculation method of fault coverage in accordance with the methods of FIGS. 9 and 10 using the calculation system of fault coverage according to the first embodiment of the present invention will be described with reference to FIGS. 11 and 12.

Figure 11:
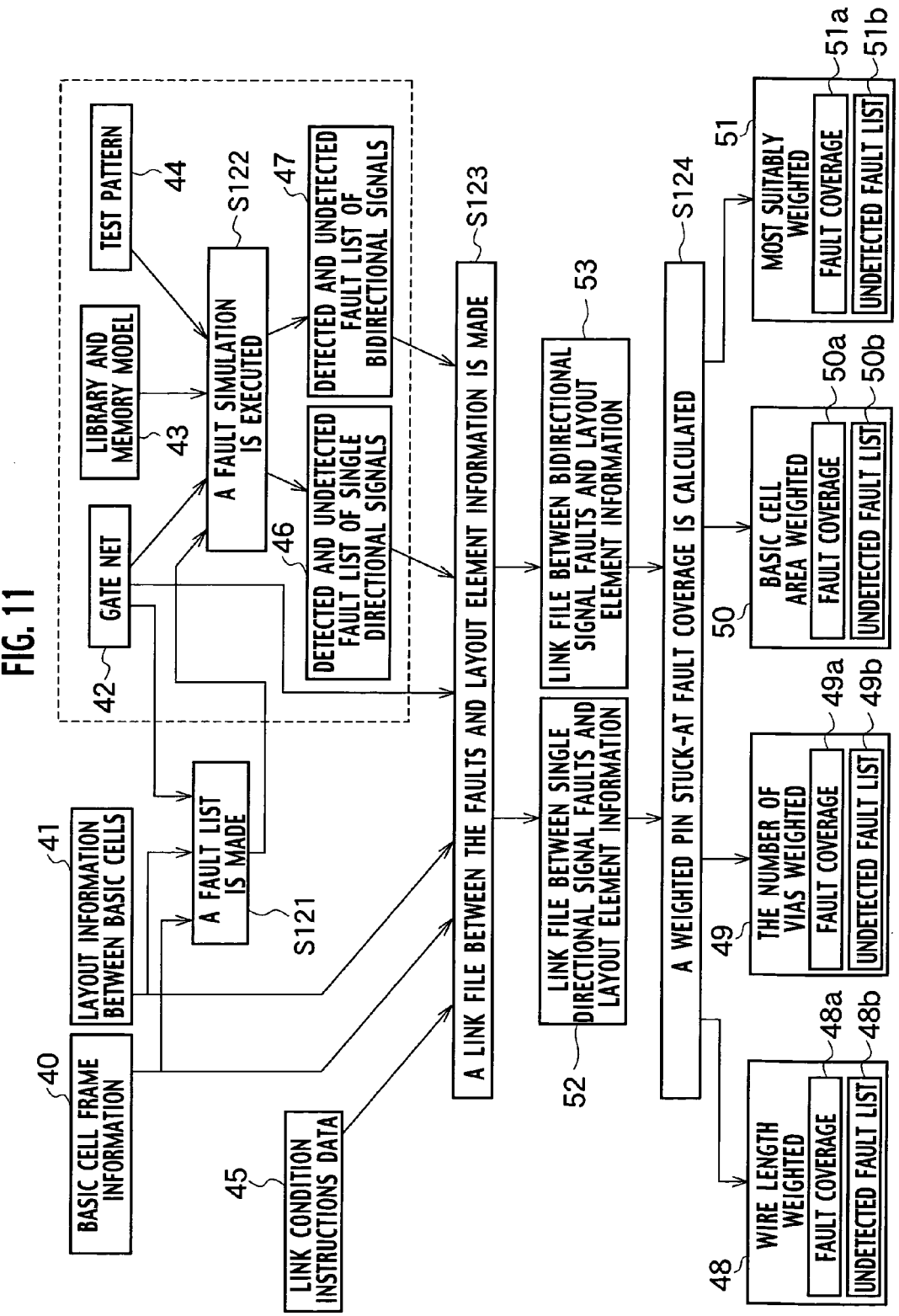
FIG. 11 is a view explaining an example of procedures of the calculation method of fault coverage according to the first embodiment of the present invention.

(a) Firstly, in order to distinguish whether a fault is that concerning a single directional signal or that concerning a bidirectional signal before executing the fault simulation, in Step S121 of FIG. 11, the fault lists are generated for both the single directional signals and the bidirectional signals by use of the layout information between basic cells 41, the basic cell frame information 40, and the gate net 42 which have been stored in the data memory unit 3 of FIG. 3. Here, the basic cell frame information 40 is information including coordinates of outer frames of the basic cells, coordinates and names of the input terminals and the output terminals, and the like.

(b) Next, in Step S122, the fault simulation is executed by use of the fault lists generated in Step S121, the gate net 42, the library and memory model 43, and the test pattern 44. Results of execution of the fault simulation are outputted for both the single directional signals and the bidirectional signals as the detected and undetected fault list of single directional signals 46 and as the detected and undetected fault list of bidirectional signals 47, respectively.

(c) In Step S123, the detected and undetected fault list of single directional signals 46 and the detected and undetected fault list of bidirectional signals 47 are linked with the basic cell frame information 40, the layout information between basic cells 41, and the gate net 42 based on the link condition instructions data 45, thereby generating the link file between faults and layout element information for both the single directional signals and the bidirectional signals (the link file between single directional signal faults and layout element information 52 and the link file between bidirectional signal faults and layout element information 53).

(d) Next, in Step S124, the weighted pin stuck-at fault coverage (the wire length weighted fault coverage 48a, the number of vias weighted fault coverage 49a, the basic cell area weighted fault coverage 50a, the most suitably weighted fault coverage 51a, and the like) is calculated based on the link file between single directional signal faults and layout element information 52 and the link file between bidirectional signal faults and layout element information 53.

Figure 12:
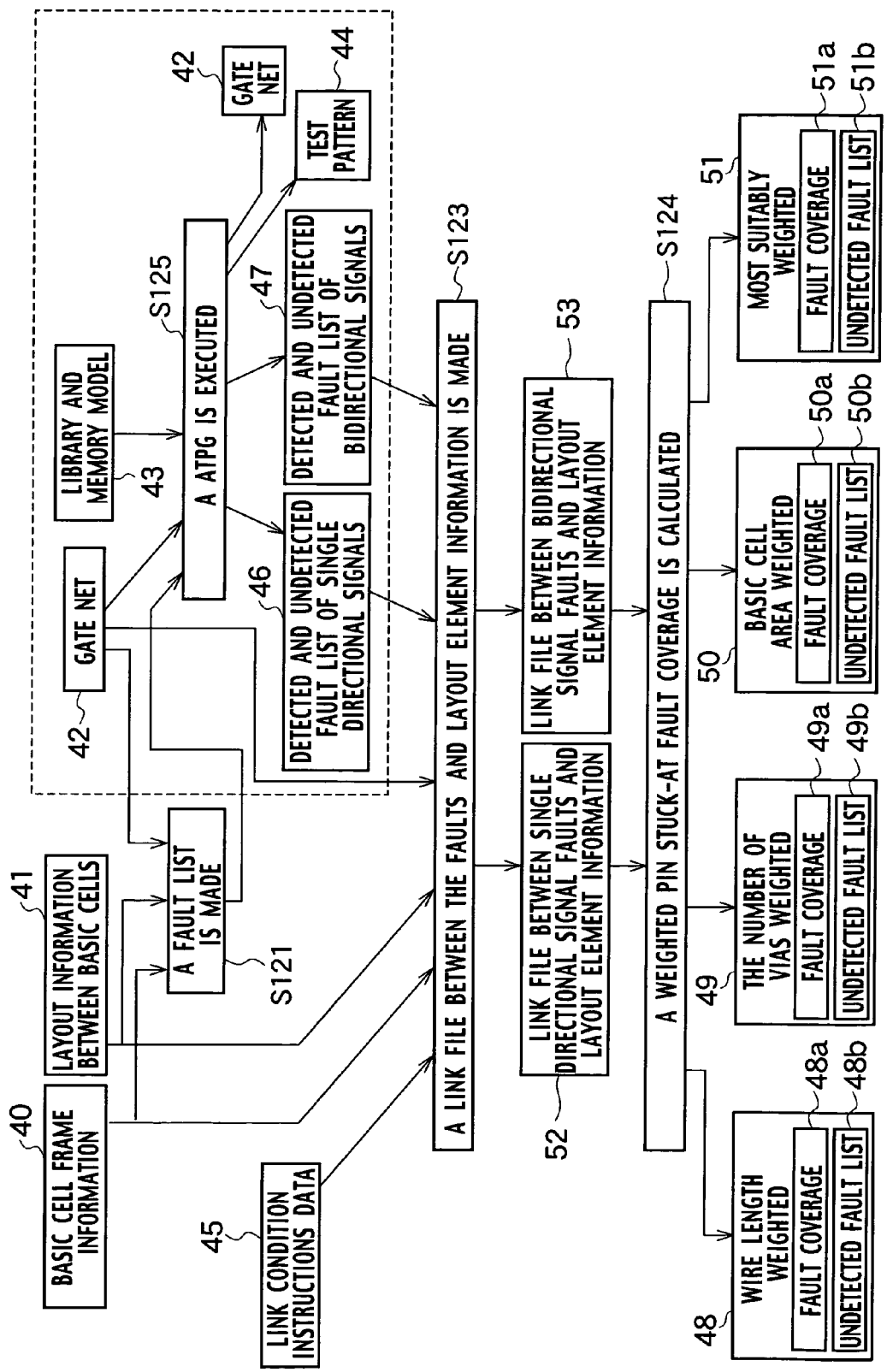
FIG. 12 is a view explaining another example of procedures of the calculation method of fault coverage according to the first embodiment of the present invention.

Here, when the fault simulation in Step S122 is the ATPG, then as shown in Step S125 of FIG. 12, the test pattern 44 is automatically generated in addition to the detected and undetected fault list of single directional signals 46 and the detected and undetected fault list of bidirectional signals 47, based on the gate net 42, the library memory and model 43, and the fault lists, and the gate net 42 including a test circuit is outputted. The processing in other Steps S121, S123, and S124 is similar to the case of executing the fault simulation in Step S122.

The calculation system of fault coverage according to the first embodiment of the present invention extracts the faults assumed on the outputs of the basic cells and the faults assumed on the inputs of the basic cells respectively as groups for each signal wire configured to be connected to output terminals of the plurality of the basic cells. Moreover, the calculation system of fault coverage executes the fault simulation so as to form pairs of the output faults and the input faults detected at the same time in each group, and deems that the paths from the outputs to the inputs on the layout are actually detected. Accordingly, it is possible to provide the calculation system of fault coverage which can achieve addition of the appropriate layout elements to the faults as the weight so as to constitute a strong correlation with an actual defect level of the LSI chips shipped to the market. Meanwhile, the calculation system of fault coverage executes the ATPG so as to form pairs of a faults at an output terminal and that at an input fault, which are detected using the same test pattern, on each signal wire connected to output terminals of the plurality of the basic cells, and deems that the paths from the outputs to the inputs on the layout are actually detected. Accordingly, it is possible to provide a calculation system of fault coverage which can achieve addition of the appropriate layout elements to the faults as the weight so as to constitute a strong correlation with an actual defect level of the LSI chips shipped to the market.

In the calculation method of fault coverage according to the first embodiment of the present invention, the paths between the output terminals of the basic cells of which the output terminals are connected to the net, and, the input terminals of the basic cells of which the input terminals are connected to the net are extracted depending on each net by use of the layout data and the gate net data of the LSI. Moreover, the layout region or the layout element covered with the path corresponding to the fault detected as a result of the pin stuck-at fault simulation (which is determined by the input terminal of the basic cell in the case of the single directional signal) is added as layout weight to the paths. When a fault corresponding to another path is detected, only the newly detected portion other than the layout region or the layout element, which has been already added, is added. Therefore, by use of the calculation method of fault coverage according to the first embodiment of the present invention, it is possible to calculate the automatically detected layout weight while making reference to the result of the fault simulation. Accordingly, it is not necessary to perform a complicated definition of the layout weight while considering a common portion and an uncommon portion of each fault in advance.

SECOND EMBODIMENT

In the finer processes in the future, the number of wiring and the wire length between basic cells will be considerably increased along with an increase in the scale of an LSI, and the number of metal wire layers will be 10 layers or more. Since the importance of extraction of the layout elements between the basic cells will be increased, the first embodiment of the present invention did not mention defects, which may occur inside the basic cells, particularly. Meanwhile, there is also a possibility of an increase in faults at an element level such as short circuits between sources and drains of transistors. Such faults can be detected by the net stuck-at fault model. However, considering that a long CPU time is generally required for the fault simulation and the ATPG, it is not reasonable to execute two types (the net and the pin) of stuck-at fault models. Therefore, description will be given of a calculation system of fault coverage and a calculation method of fault coverage which can handle information inside the basic cell with the pin fault model.

Figure 13:
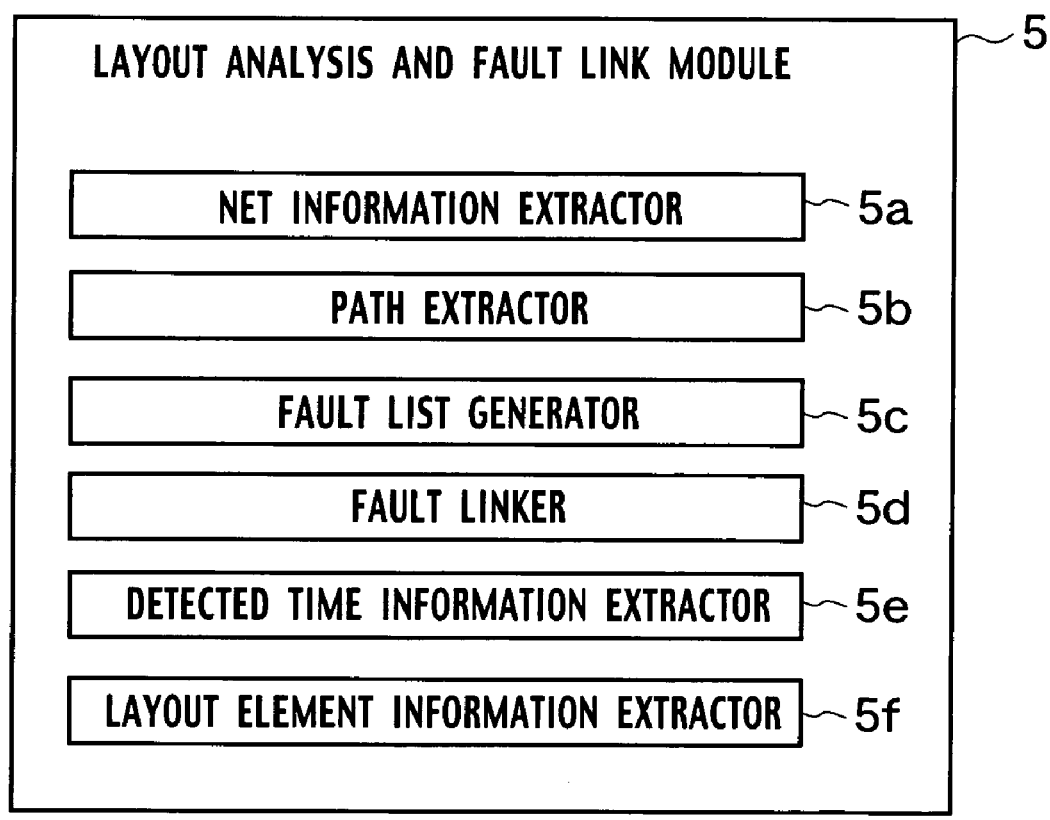
FIG. 13 is a view showing a configuration of a layout analysis and fault link module of a calculation system of fault coverage according to a second embodiment of the present invention.
Figure 17:
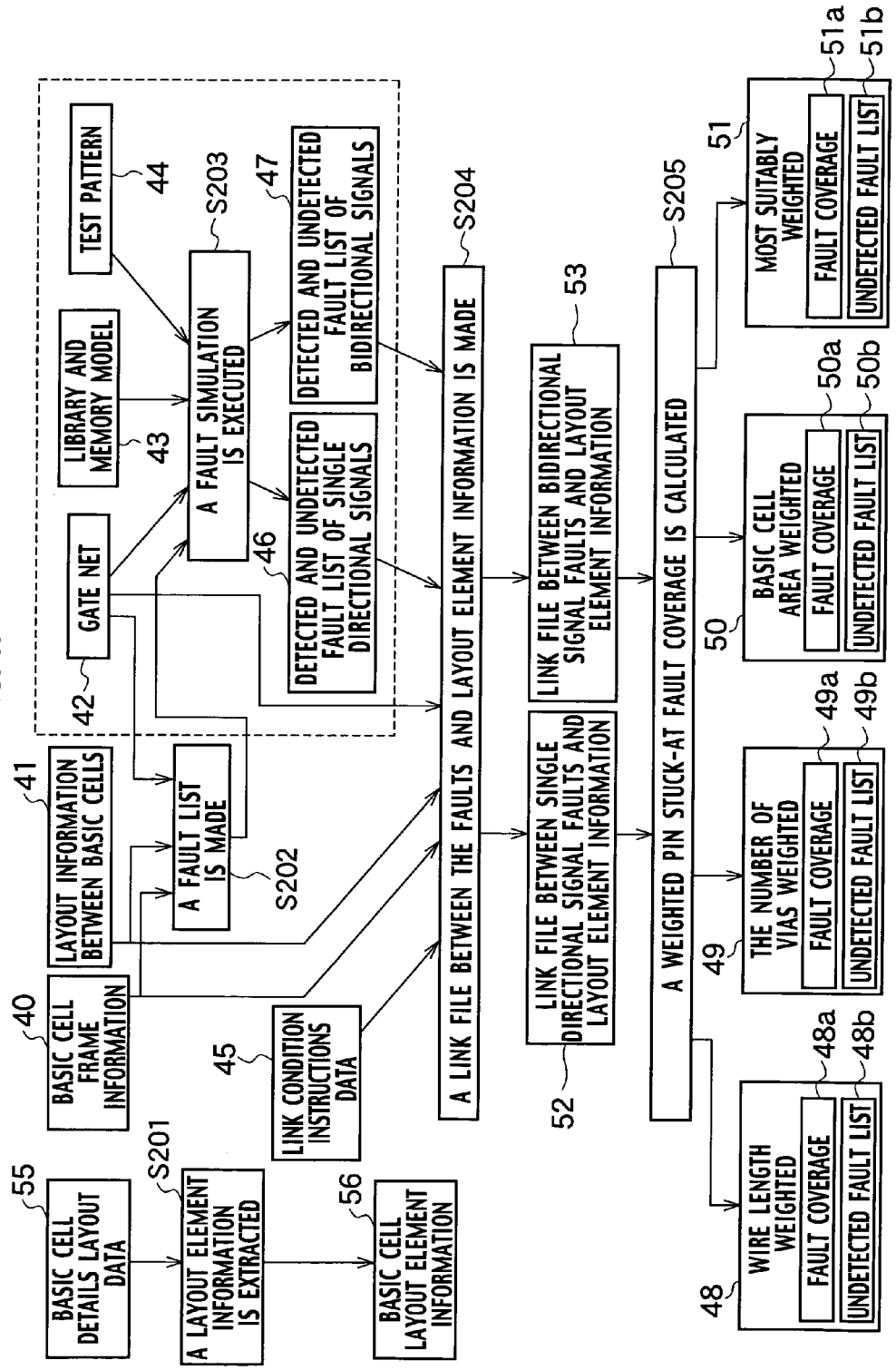
FIG. 17 is a view explaining a processing procedure of the calculation method of fault coverage according to the second embodiment of the present invention.

A calculation system of fault coverage according to a second embodiment of the present invention includes an input unit 31, an output unit 32, an auxiliary memory unit 33, and a main memory unit 34, a central processing unit (CPU) 2, and a data memory unit 3 as described in the first embodiment of the present invention shown in FIG. 1. Moreover, the CPU 2 encompasses a data acquire module 4, a layout analysis and fault link module 5, a fault detecte module 6, and a weight calculate module 7. In addition, as shown in FIG. 13, the layout analysis and fault link module 5 encompasses a net information extractor 5a, a path extractor 5b, a fault list generator 5c, a fault linker 5d, a detected time information extractor 5e, and a layout element information extractor 5f. The CPU 2 of the second embodiment is different from the CPU 2 of the first embodiment in that the layout element information extractor 5f is further encompassed. In addition, the fault linker 5d and the data memory unit 3 are also slightly different. As shown in FIG. 17, the layout element information extractor 5f extracts and outputs basic cell layout element information from basic cell details layout data. The fault linker 5d links basic cell frame information, layout information between basic cells, a gate net, fault lists as a result of execution of the fault simulation or the ATPG, and basic cell layouts, which have been stored in the data memory unit 3, with a detected and undetected fault list of single directional signals 46 and a detected and undetected fault list of bidirectional signals 47 based on the link condition instructions data, and thereby generates link files between signal faults and layout element information for both the single directional signals and the bidirectional signals.

Figure 14:
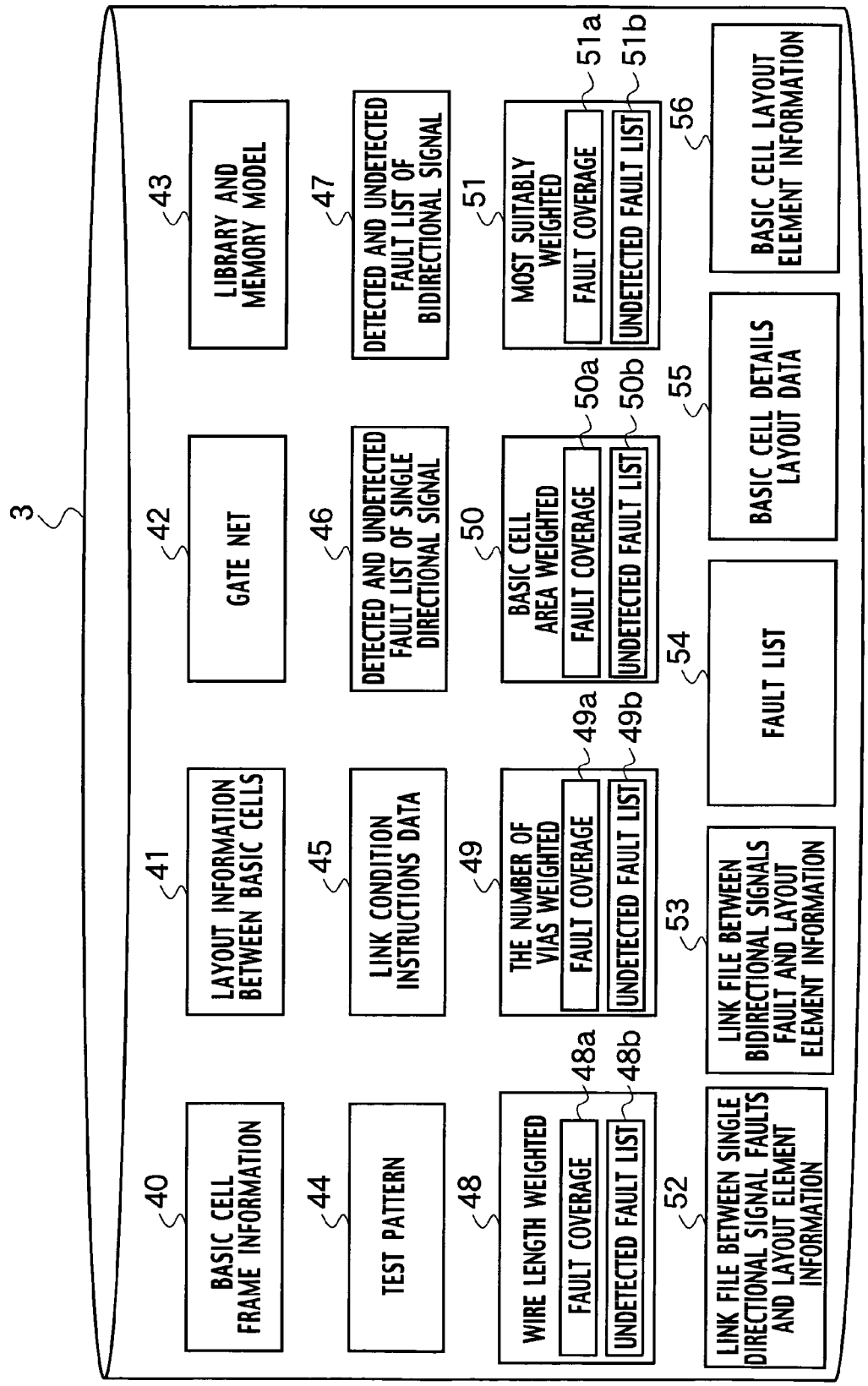
FIG. 14 is a view showing a configuration of data structure of a data memory unit of the calculation system of fault coverage according to the second embodiment of the present invention.

As shown in FIG. 14, the data memory unit 3 according to the second embodiment of the present invention stores information such as basic cell frame information 40, layout information between basic cells 41, a gate net 42, a library and memory model 43, a test pattern 44, a fault list 54, link condition instructions data 45, the detected and undetected fault list of single directional signals 46, the detected and undetected fault list of bidirectional signals 47, a link file between single directional signal faults and layout element information 52, a link file between bidirectional signal faults and layout element information 53, the wire length weighted fault coverage 48a and the wire length weighted undetected fault list 48b, the number of vias weighted fault coverage 49a and the number of vias weighted undetected fault list 49b, the basic cell area weighted fault coverage 50a and the basic cell area weighted undetected fault list 50b, the most suitably weighted fault coverage 51a and the most suitably weighted undetected fault list 51b; in addition, basic cell details layout data 55, basic cell layout element information 56, and the like.

Figure 15:
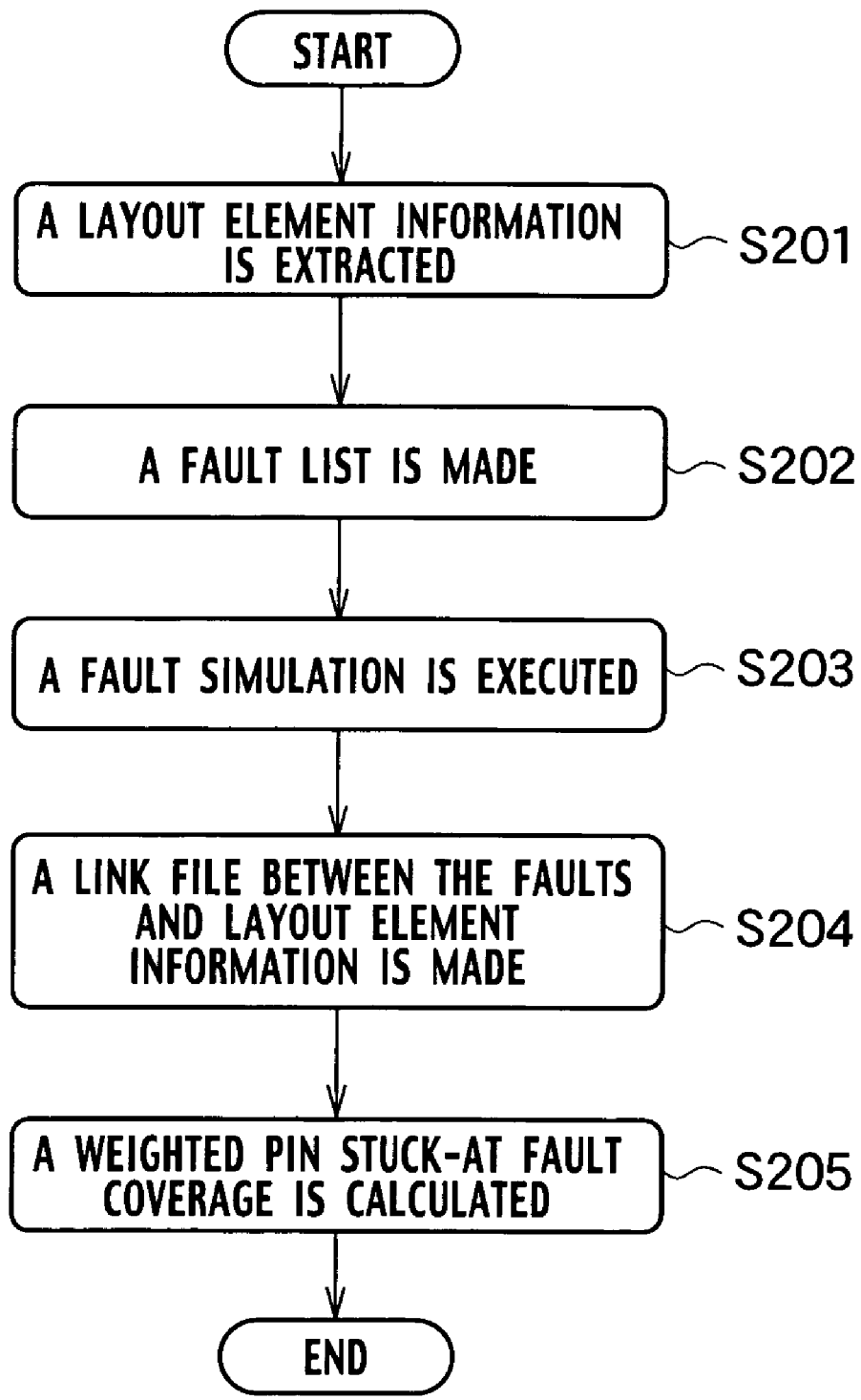
FIG. 15 is a flowchart explaining a calculation method of fault coverage according to the second embodiment of the present invention.
Figure 16:
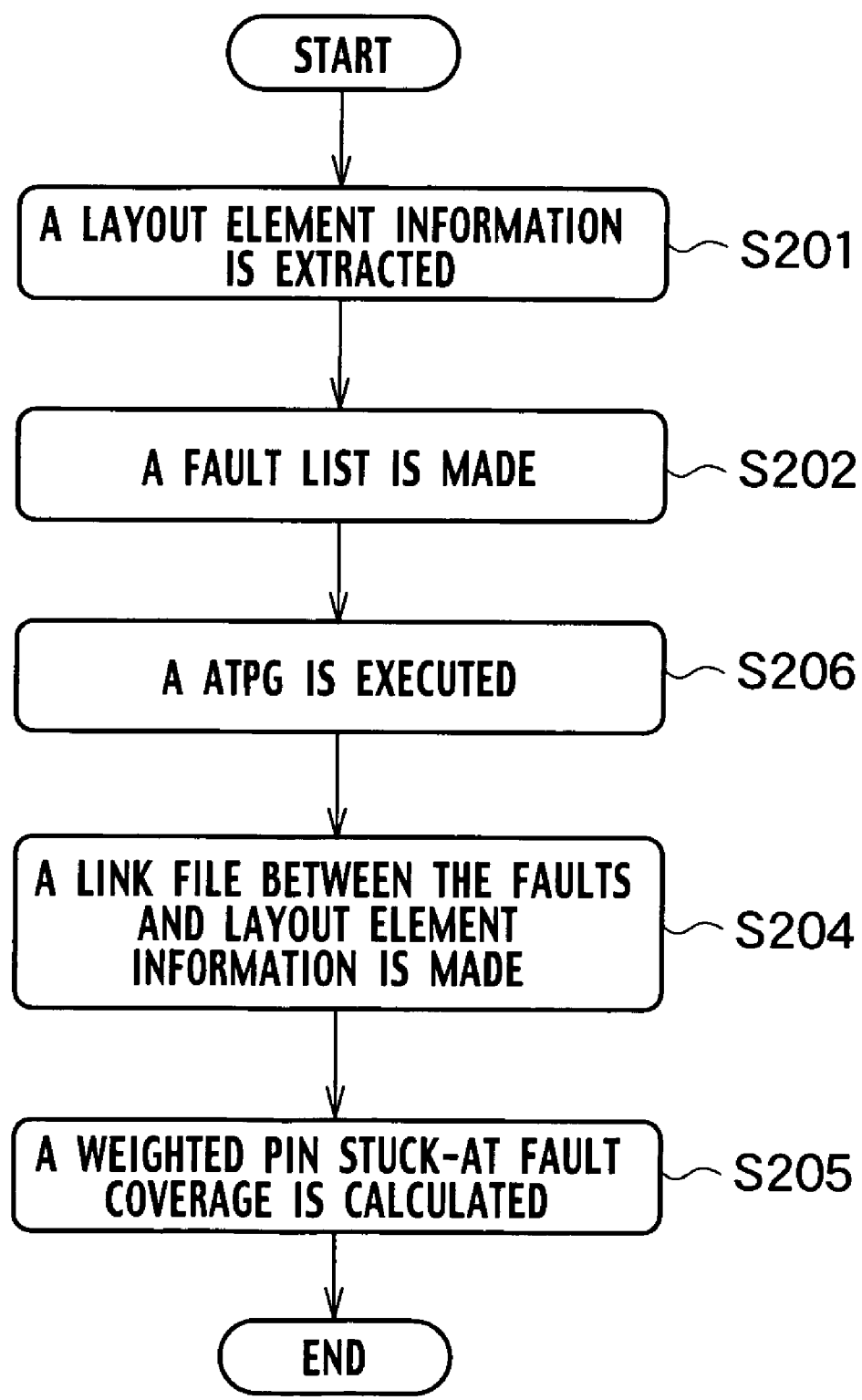
FIG. 16 is a flowchart explaining another calculation method of fault coverage according to the second embodiment of the present invention.

FIG. 15 is a flowchart showing an example of method in the case of calculating the fault coverage by use of the fault simulation. FIG. 16 is a flowchart showing an example of method in the case of calculating the fault coverage by use of the ATPG. In the following, examples of the calculation method of the fault coverage in accordance with the methods of FIG. 15 and FIG. 16 using the calculation system of fault coverage according to the second embodiment of the present invention will be described with reference to FIG. 17 and FIG. 18.

The calculation method of fault coverage according to the second embodiment of the present invention will be described with reference to FIG. 17 to FIG. 19B.

(a) Firstly, in Step S201, the layout elements are extracted from the basic cell details layout data 55, and the basic cell layout element information 56 is generated as layout element weight information concerning the basic cells.

(b) Next, in Step S202, the fault lists are generated for both the single directional signal and the bidirectional signal by use of the basic cell frame information 40, the layout information between basic cells 41, and the gate net 42.

(c) Next, in Step S203, the fault simulation is executed by use of the fault lists generated in Step S202, the gate net 42, the library and memory model 43, and the test pattern 44. Results of execution of the fault simulation are outputted for both the single directional signals and the bidirectional signals as the detected and undetected fault list of single directional signals 46 and the detected and undetected fault list of bidirectional signals 47, respectively.

(d) Next, in Step S204, the basic cell layout element information 56, the link condition instructions data 45, the basic cell frame information 40, the layout information between basic cells 41, and the gate net 42 are linked with detected and undetected faults in the detected and undetected fault list of single directional signals 46 and the detected and undetected fault list of bidirectional signals 47, thereby generating the link file between faults and layout element information depending on the single directional signals and the bidirectional signals (the link file between single directional signal faults and layout element information 52 and the link file between bidirectional signal faults and layout element information 53).

(e) Next, in Step S205, the weighted pin stuck-at fault coverage (the wire length weighted fault coverage 48a, the number of vias weighted fault coverage 49a, the basic cell area weighted fault coverage 50a, the most suitably weighted fault coverage 51a, and the like) are calculated based on the link file between single directional signal faults and layout element information 52 and the link file between bidirectional signal faults and layout element information 53.

Figure 18:
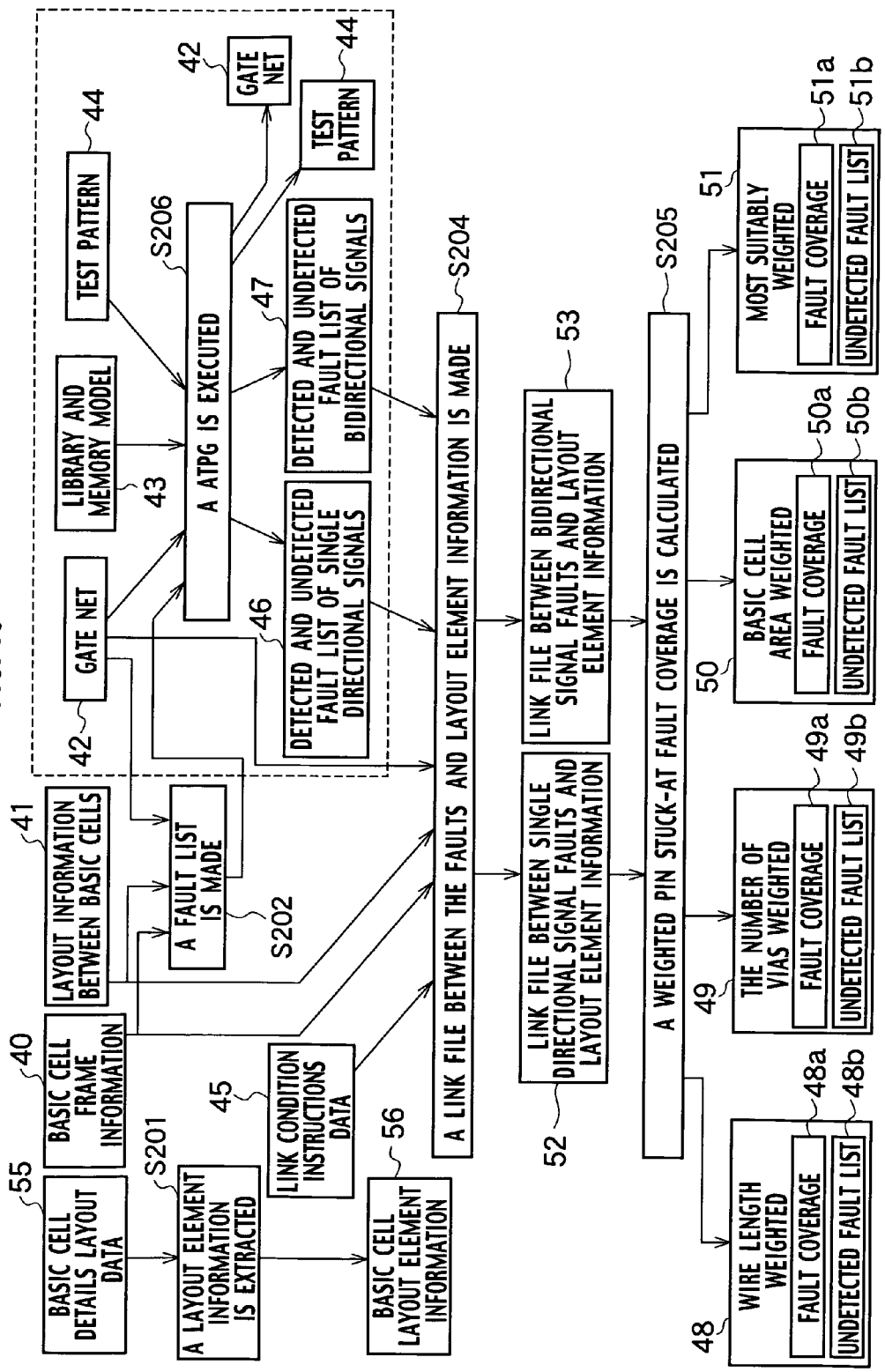
FIG. 18 is a view explaining another processing procedure of the calculation method of fault coverage according to the second embodiment of the present invention.

Here, when the fault simulation in Step S203 is the ATPG, then as shown in Step S206 of FIG. 18, the test pattern 44 is automatically generated in addition to the detected and undetected fault list of single directional signals 46 and the detected and undetected fault list of bidirectional signals 47, based on the gate net 42, the library memory model 43, and the fault lists, and the gate net 42 including a test circuit is outputted. The processing in other Steps S201, S202, S204, and S205 is similar to the case of executing the fault simulation in Step S203.

In general, an automatic placement and routing tool does not have necessary information concerning the inside of the basic cell. Accordingly, concerning the basic cell, a connection wire length and the number of minimum contacts when the inside of the basic cell is viewed from each terminal are extracted from actual detailed layout data (such as GDS2 data) by use of a layout parameter extracting tool. Moreover, the area of the basic cell is added to the output terminal, as the layout weight. In this case, the basic cell having a plurality of outputs is provided with area information which is defined as "(a common portion)+(an individual portion)".

Figure 19A:
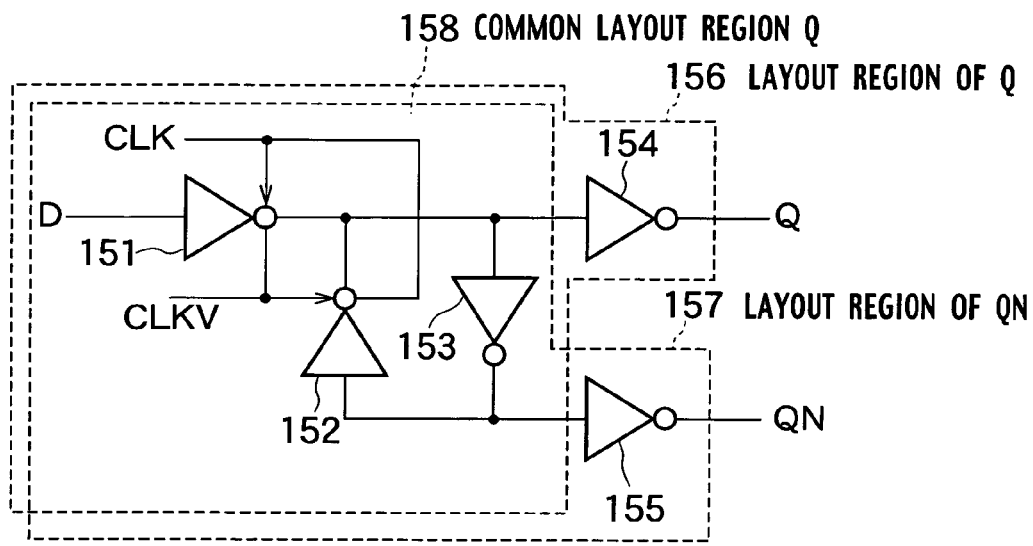
FIG. 19A is a schematic view showing a latch circuit in which layout regions corresponding to plural output terminals overlap.

For example, when circuit portions concerning the plurality of output terminals overlap each other as shown in FIG. 19A, a latch circuit includes a clocked inverter 151, a clocked inverter 152 which forms an internal loop for data retention, an inverter 153, and output inverters 154 and 155. Here, CLK and CLKV are clock signals which have mutually inverted phases and the clocked inverter functions as the inverter when an input signal indicated by an arrow is "1" and performs hi-Z output when the input signal is "0".

In this event, it seems appropriate to define regions surrounded by broken lines 156 and 157 as layout regions corresponding to output terminals Q and QN, respectively. However, in this case, existence of a layout area 158, which is common to the output terminals Q and QN, should be noted.

That is, when the layout regions corresponding to the output terminals Q and QN are basically defined as the regions surrounded by the broken lines 156 and 157, a problem arises because the layout region 58 common to both layout regions is counted twice.

Figure 19B:
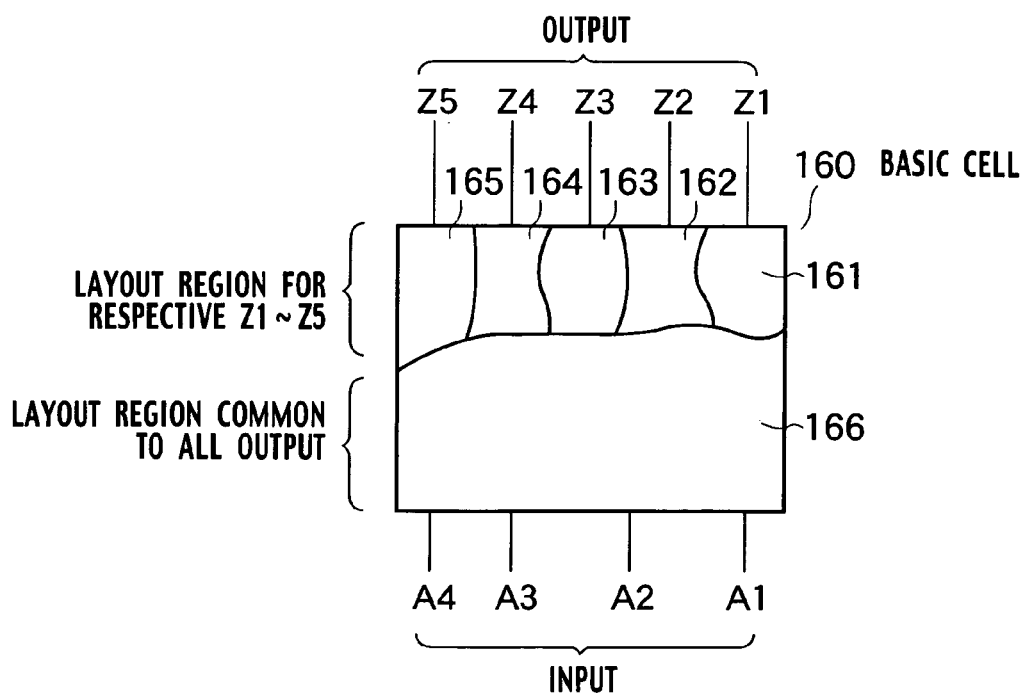
FIG. 19B is a view showing a general case of overlapping of layout regions corresponding to plural output terminals.

FIG. 19B schematically shows this condition. In a basic cell 160 including input terminals A1 to A4, and output terminals Z1 to Z5, a layout region 166 is a layout region common to all the output terminals; meanwhile, layout regions 161 to 165 are layout regions individually corresponding to the output terminals Z1 to Z5.

When a fault is detected concerning any one of the output terminals Z1 to Z5, a layout related parameter needs to be extracted from the common layout region 166 and the individual layout region corresponding to the fault. Thereafter, when a fault concerning a different output terminal is detected, the layout related parameter needs to be extracted from the individual layout region corresponding to the different output terminal. A similar operation is applicable when a fault is detected in yet another output terminal.

Although such a partitioning mode is a method for avoiding duplicate extraction from the common layout region 166, the mode does not cause any problem in terms of software processing as long as regions related to the respective output terminals are obtained in advance and a final layout region corresponding to a result of fault simulation is obtained.

In the fault list enumerating the faults assumed on the LSI for testing, a pin stuck-at fault is expressed by a combination of a basic cell which is made individually distinguishable as an instance name, and an input terminal and an output terminal thereof. Accordingly, when the processing for calculating area weight is executed in due course, "(the common portion)+(the individual portion)" needs to be added only when a fault associated with an instance name, which appears for the first time (0/1 stuck-at faults must be discriminated herein) as the instance name, is detected, and only the value corresponding to the individual portion needs to be added when a fault assumed on a different output terminal in the same instance name is detected later.

Therefore, in the calculation system of fault coverage and the calculation method of fault coverage according to the second embodiment of the present invention, concerning the information inside the basic cell, the necessary layout elements are extracted from an actual layout base data (such as GDS2 data) and are retained as the layout weight information file concerning the basic cell. Then, the layout weight is added in combination with the layout elements extracted among the basic cells. In this way, it is possible to obtain the weighted fault coverage corresponding to major faults which can be dealt with the pin stuck-at fault and to obtain (weighted) undetected faults concerning the LSI for testing.

According to the calculation system of fault coverage and the calculation method of fault coverage of the first and second embodiments of the present invention, it is possible to acquire the detected information linked accurately with the layout in the bidirectional signal wires existing in a large region on the LSI chip, and a strong correlation with an actual defect level of the LSI chips in the market is thereby obtained. As a result, it is possible to control a defect level with a high degree of precision. Moreover, it becomes clear which fault should be preferentially detected and how many more test patterns should be added to achieve detection at a desired level. Accordingly, efficiency of test pattern development for achieving the demanded testing quality is improved and also optimized.

OTHER EMBODIMENTS

Although the fault detecte module 6 is included in the CPU 2 in the first and second embodiments of the present invention, it is needless to say that the fault detecte module 6 can be provided outside and connected to the CPU 2 or the calculation system of fault coverage 1.

Various modifications will become possible for those skilled in the art after receiving the teachings of the present disclosure without departing from the scope thereof.

What is claimed is:

1. A calculation system of fault coverage comprising:
   a data acquiring module configured to acquire layout information and gate net data of an LSI;
   a layout analysis and fault link module configured to analyze a condition of connection of an input terminal and an output terminal of a basic cell regarding an entire layout based on the layout information and the gate net data, to extract the result of the analysis as layout element information, and to generate an undetected fault list;
   a fault detecting module configured to execute any of fault simulation and an automatic test pattern generation on the undetected fault list and to generate a detected and undetected fault list; and
   a weight calculating module configured to add the layout element information, which includes a path between the output terminal of the basic cell, of which the output terminal is connected, to a gate net included in the gate net data and the input terminal of the basic cell, of which the input terminal is connected, to the gate net, corresponding to a fault in the detected and undetected fault list as weight to a stuck-at fault assumed to the input terminal, based on a link file between faults and layout element information to be generated based on the layout information, the gate net data, and the detected and undetected fault list by the layout analysis and fault link module.

2. The system of claim 1, wherein the layout analysis and fault link module comprising:
   a net information extractor configured to extract net information from the layout information and the gate net data;
   a path extractor configured to extract a path connecting between the basic cells from the layout information and the gate net data;

a detected time information extractor configured to extract information indicating that faults assumed to occur on the input terminal and on the output terminal are detected at the same time from the detected and undetected fault list;

a fault list generator configured to generate a fault list from the layout information and the gate net data; and a fault linker configured to generate a link file between faults and layout element information by linking the layout information, the gate net data, and the detected and undetected fault list.

3. The system of claim 2, wherein the layout analysis and fault link module further comprising a layout element information extractor configured to extract basic cell layout element information from basic cell details layout data.

4. The system of claim 1, wherein the weight calculating module comprises:

a total layout element calculator configured to calculate total layout elements of net information except the part that redundant fault influenced; and a weight calculator configured to calculate weighted pin stuck-at fault coverage based on a link file between faults and layout element information, and to generate a weighted undetected fault list.

5. The system of claim 4, wherein the weighted pin stuck-at fault coverage and the weighted undetected fault list include:

wire length weighted fault coverage and a wire length weighted undetected fault list;

number of vias weighted fault coverage and a number of vias weighted undetected fault list;

basic cell area weighted fault coverage and a basic cell area weighted undetected fault list; and suitably weighted fault coverage and a suitably weighted undetected fault list.

6. The system of claim 5, wherein the wire length weighted fault coverage is calculated by dividing a wire length corresponding to the detected faults by an evaluated total wire length except the part that redundant faults influenced.

7. The system of claim 5, wherein the number of vias weighted fault coverage is calculated by dividing a number of vias corresponding to the detected faults by an evaluated total number of vias except the part that redundant faults influenced.

8. The system of claim 7, wherein the number of vias weighted fault coverage is calculated by counting a number of minimum vias, a number of double vias and a number of stacked vias at the suitable ratio respectively.

9. The system of claim 5, wherein the basic cell area weighted fault coverage is calculated by dividing a basic cell area corresponding to the detected faults by an evaluated total basic cell area except the part that redundant faults influenced.

10. The system of claim 1, wherein the fault detecting module comprises at least any of the fault simulator and the automatic test pattern generation.

11. A computer-implemented calculation method of fault coverage comprising:

acquiring layout information and gate net data of an LSI;

generating a fault list by analyzing a condition of connection of an input terminal and an output terminal of a basic cell regarding an entire layout based on the layout information and the gate net data and extracting the result of the analysis as layout element information;

executing any of fault simulation and automatic test pattern generation on the fault list and generating a detected and undetected fault list;

generating a link file between faults and layout element information by use of the layout information, the gate net data, and the detected and undetected fault list; and adding a layout element, which includes a path between the output terminal of the basic cell, of which the output terminal is connected, to a gate net included in the gate net data and the input terminal of the basic cell, of which the input terminal is connected, to the gate net, corresponding to any one of a detected fault and a undetected fault as weight to a stuck-at fault assumed to the input terminal.

12. The method of claim 11, wherein the generating the link file between faults and layout element information comprises:

extracting a path connecting between the basic cells from the layout information and the gate net data;

extracting information indicating that faults assumed to have occurred on the input terminal and on the output terminal are detected at the same time from the detected and undetected fault list; and generating a link file between faults and layout element information by linking the layout information, the gate net data, and the information indicating that faults assumed to have occurred on the input terminal and on the output terminal are detected at the same time.

13. The method of claim 12, wherein the weighted pin stuck-at fault coverage and the weighted undetected fault list are any of wire length weighted fault coverage and a wire length weighted undetected fault list, and number of vias weighted fault coverage and a number of vias weighted undetected fault list, and basic cell area weighted fault coverage and a basic cell area weighted undetected fault list, and suitably weighted fault coverage and a suitably weighted undetected fault list.

14. The method of claim 13, wherein the wire length weighted fault coverage is calculated by dividing a wire length corresponding to the detected fault by an evaluated total wire length except the part that redundant faults influenced.

15. The method of claim 13, wherein the number of vias weighted fault coverage is calculated by dividing a number of vias corresponding to the detected fault by an evaluated total number of vias except the part that redundant faults influenced.

16. The method of claim 15, wherein the number of vias weighted fault coverage is calculated by counting a number of minimum vias, a number of double vias and a number of stacked vias at the suitable ratio respectively.

17. The method of claim 13, wherein the basic cell area weighted fault coverage is calculated by dividing a basic cell area corresponding to the detected fault by an evaluated total basic cell area except the part that redundant faults influenced.

18. The method of claim 12, wherein the generating the link file between faults and layout element information further comprising extracting a basic cell layout element information from the a basic cell details layout data.

19. The method of claim 11, wherein the adding the layout element comprises:

calculating total layout elements of the connection wiring except the part that redundant faults influenced; and repeating addition of a corresponding layout region and a layout element to any of the input terminal and the output terminal based on the link file between faults and layout element information when a path is activated in response to the detected fault and the undetected fault, calculating weighted pin stuck-at fault coverage, and generating a weighted undetected fault list.

20. The method of claim 11, wherein the detected and undetected fault list is generated by executing any of fault simulation and an automatic test pattern generation.

* * * * *